(12) United States Patent
Chawla et al.

(10) Patent No.: US 11,937,757 B2
(45) Date of Patent: Mar. 26, 2024

(54) AUTONOMOUS DISHWASHER

(71) Applicants: Pratik Chawla, Foster City, CA (US); Sri Rama Prasanna Pavani, San Carlos, CA (US)

(72) Inventors: Pratik Chawla, Foster City, CA (US); Sri Rama Prasanna Pavani, San Carlos, CA (US)

(73) Assignee: Dishcare Inc., San Carlos, CA (US)

( * ) Notice: Subject to any disclaimer, the term of this patent is extended or adjusted under 35 U.S.C. 154(b) by 31 days.

(21) Appl. No.: 17/687,332

(22) Filed: Mar. 4, 2022

(65) Prior Publication Data
US 2023/0277034 A1 Sep. 7, 2023

(51) Int. Cl.
| | |
|---|---|
| *A47L 15/46* | (2006.01) |
| *A47L 15/16* | (2006.01) |
| *A47L 15/42* | (2006.01) |
| *B25J 9/16* | (2006.01) |
| *B25J 11/00* | (2006.01) |

(52) U.S. Cl.
CPC ............... *A47L 15/46* (2013.01); *A47L 15/16* (2013.01); *A47L 15/4289* (2013.01); *A47L 15/4295* (2013.01); *B25J 9/16* (2013.01); *B25J 11/0085* (2013.01); *A47L 2401/04* (2013.01); *A47L 2501/20* (2013.01); *A47L 2501/36* (2013.01)

(58) Field of Classification Search
None
See application file for complete search history.

(56) References Cited

U.S. PATENT DOCUMENTS

| | | | |
|---|---|---|---|
| 7,269,479 B2 | 9/2007 | Okamoto et al. | |
| 11,684,232 B2 * | 6/2023 | Pavani | A47L 15/4295 134/56 D |
| 2018/0036889 A1 | 2/2018 | Birkmeyer | |
| 2022/0233050 A1 * | 7/2022 | Pavani | G06V 10/255 |

FOREIGN PATENT DOCUMENTS

CN 108013841 B * 1/2023 ......... A47L 15/0086

* cited by examiner

*Primary Examiner* — Rita P Adhlakha

(57) ABSTRACT

The invention is a system for cleaning an article comprising: a static nozzle to spray a fluid, wherein the position and the orientation of said nozzle remains unchanged; a robotic arm to grasp and move said article so that said fluid is sprayed on said article; a camera to acquire an image of said article; a processor to execute an algorithm based on said image to determine a cleaning protocol, wherein said cleaning protocol lists time sequence of a plurality of robot positions; whereby said article is cleaned thoroughly in real-time. The invention is a also a system for cleaning an article comprising a wash module having the means to transform a soiled article into a clean article, wherein the position of said wash module remains unchanged; a first module for holding said article, wherein said first module pulls out, rises in height, lowers in height, and pulls back in, wherein said article is loaded or unloaded after said first module rises in height; a second module for holding said article, wherein said second module pulls out and pulls back in, wherein said article is loaded or unloaded after said second module pulls out; whereby said article can be loaded or unloaded comfortably without bending.

10 Claims, 30 Drawing Sheets

AUTONOMOUS DISHWASHER

FIELD OF THE INVENTION

This invention relates generally to cleaning a dish using a robotic arm and fluid from a static nozzle, wherein the dish is dropped off and picked up without bending.

BACKGROUND

Cleaning soiled dishes is a prevalent daily chore in kitchens across the world. Even in a kitchen having a dishwasher, the kitchen sink typically tends to pile up with soiled dishes, for reasons ranging from the effort required to load dishes in a dishwasher to the effort needed to put away clean dishes before soiled dishes can be loaded.

Conventional dishwashers have numerous drawbacks. They use a batch washing technique, which is designed to clean a large number of dishes at once. Accordingly, they are typically not turned on until they are full. This leads to soiled dishes waiting for hours to be cleaned, giving the opportunity for microbial colonies (germs) to grow on dishes. The waiting of soiled dishes also results in drying out of dishes, which makes them more difficult to clean. Conventional dishwashers therefore create unhygienic conditions in kitchens while making the task of cleaning dishes harder than necessary.

Furthermore, conventional dishwashers lack the ability to locate and target soiled regions of an individual dish. As a result, it spends much more resources on clean regions of dishes than what is needed, in an attempt to maximize the chances of all soiled regions of dishes coming out clean. Batch dishwashing fundamentally suffers from a tradeoff between the duration of the dishwashing cycle and the cleanliness of each dish. Without the capability to evaluate the cleanliness of each dish, batch dishwashing resorts to longer dishwashing cycles, spanning hours, to increase the chances of removing dirt from all dishes, thereby causing a significant wastage of time, energy, and water. Notwithstanding the above, conventional dishwashers still don't guarantee the quality of the cleanliness of the dishes.

Conventional dishwashers require us to spend time on loading and putting the dishes away. People find loading dishes into a dishwasher painful because it requires repeated bending to transfer dishes from a kitchen sink or countertop to a dishwasher which is typically located at a substantially lower height. What is also painful is to scrape and dispose of leftovers from soiled dishes and frequently rinse soiled dishes before arranging them thoughtfully into a dishwasher. Skimping on any of these steps increases the chances of dishes not coming out clean even after a long dishwashing cycle spanning hours. People also find putting away clean dishes painful because it requires repeated bending to transfer dishes from a dishwasher to cabinets located in different regions of a typical kitchen.

Reliable grasping and maneuvering of dishes requires several skills. People handle dishes with ease because of their dexterous hands and perceptive vision. Conventional robotic arms have neither of the above capabilities for reliably handling dishes. Such conventional robotic arms are typically best suited for moving an independent object of a single type in an otherwise open unobstructed environment.

Accordingly, there is a need for an improved system and method to clean dishes. One that could clean a soiled dish in real-time without requiring it to wait until more soiled dishes accumulate; one that could locate and target soiled regions of a dish, one that could guarantee the cleanliness of a dish; one that could minimize energy and water consumption; and one that could eliminate the need for loading and putting the dishes away.

SUMMARY

The invention is a system for cleaning an article.

In some embodiments, the invention is a system for cleaning an article, comprising: a static nozzle to spray a fluid, wherein the position and the orientation of said nozzle remains unchanged; a robotic arm to grasp and move said article so that said fluid is sprayed on said article; a camera to acquire an image of said article; a processor to execute an algorithm based on said image to determine a cleaning protocol, wherein said cleaning protocol lists time sequence of a plurality of robot positions; whereby said article is cleaned thoroughly in real-time.

In some embodiments, the invention is a system for cleaning an article, comprising: a wash module having the means to transform said soiled article into a clean article, wherein the position of said wash module remains unchanged; a first module for holding said article, wherein said first module pulls out, rises in height, lowers in height, and pulls back in, wherein said article is loaded or unloaded after said first module rises in height; a second module for holding said article, wherein said second module pulls out and pulls back in, wherein said article is loaded or unloaded after said second module pulls out; whereby said article can be loaded or unloaded comfortably without bending.

DETAILED DESCRIPTION OF THE PREFERRED EMBODIMENTS

Figure 1:
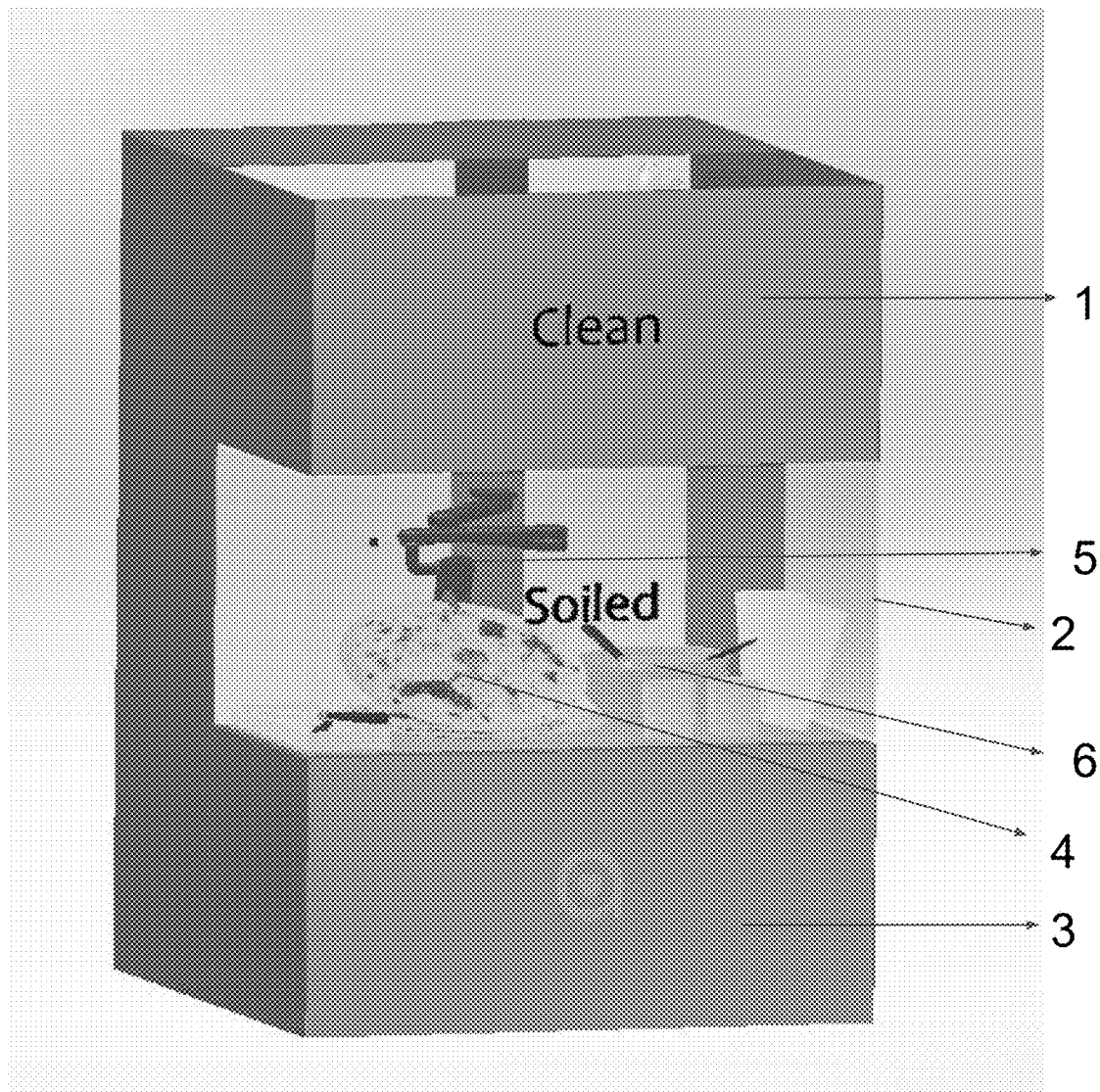
FIG. 1 shows a three-dimensional view of the robot picking a soiled plate from the soiled module in an autonomous dishwasher, in accordance with the invention.

FIG. 1 shows a three-dimensional view of robotic arm 5 picking a soiled plate 4 from the soiled module 2 in an autonomous dishwasher, in accordance with the invention. The front and side walls of soiled module 2 are not shown, in order to reveal the internal details of the soiled module.

Figure 2:
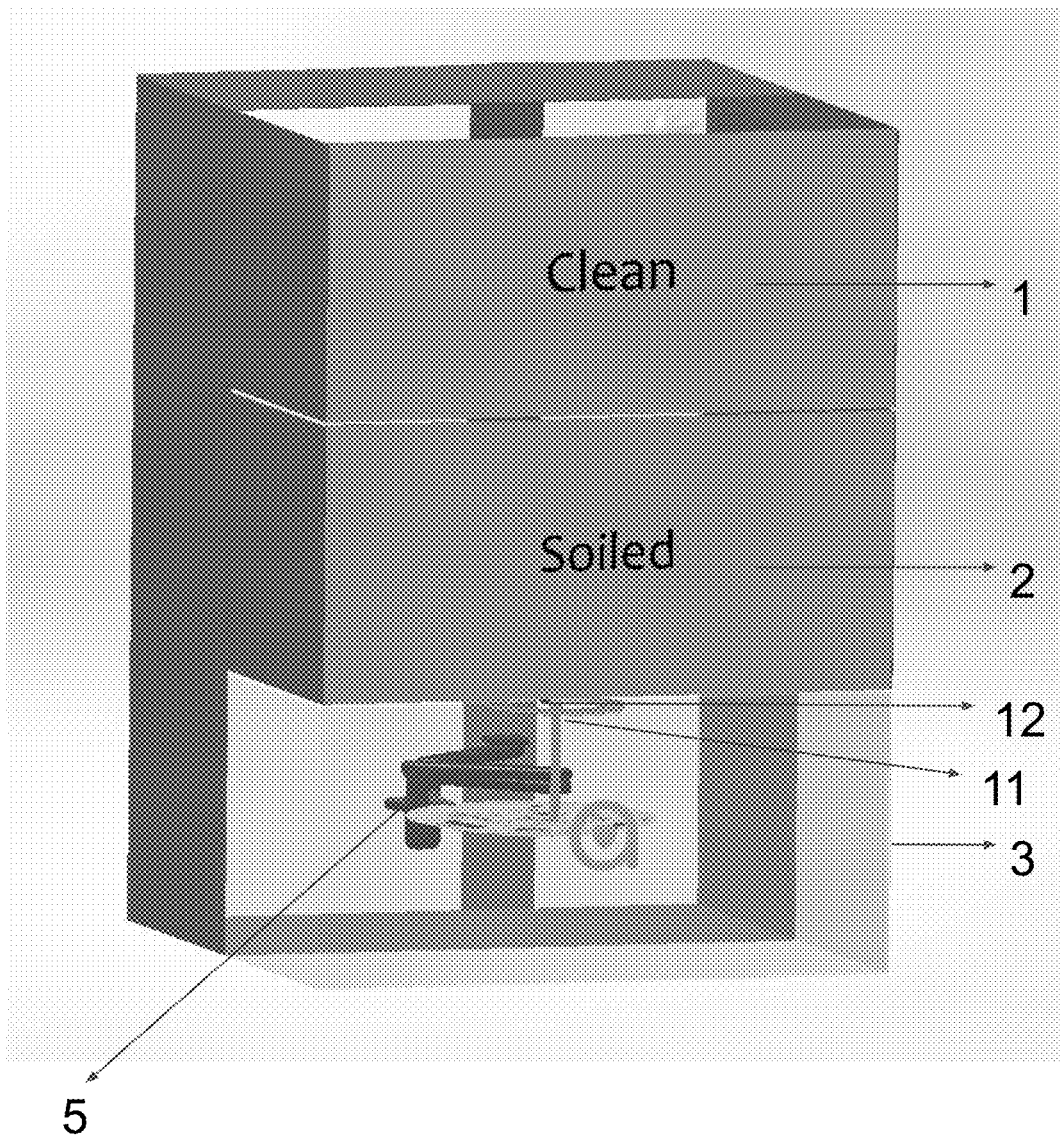
FIG. 2 shows a three-dimensional view of the robot washing a soiled plate with fluid from a static nozzle in an autonomous dishwasher, in accordance with the invention.

FIG. 2 shows a three-dimensional view of robotic arm 5 washing a soiled plate 4 with fluid from a static nozzle 11 in an autonomous dishwasher, in accordance with the invention. The front and side walls of wash module 3 are not shown, in order to reveal the internal details of the wash module. The wash module has the means to transform a soiled dish into a clean dish. In some embodiments, the static nozzle 11 located inside wash module 3 sprays a fluid on a dish. In some embodiments, the position and the orientation of the static nozzle remains unchanged. The robotic arm 5 grasps and moves the soiled plate 4 so that a fluid is sprayed on different regions of the plate. In some embodiments, the position of wash module 3 remains unchanged.

Figure 3:
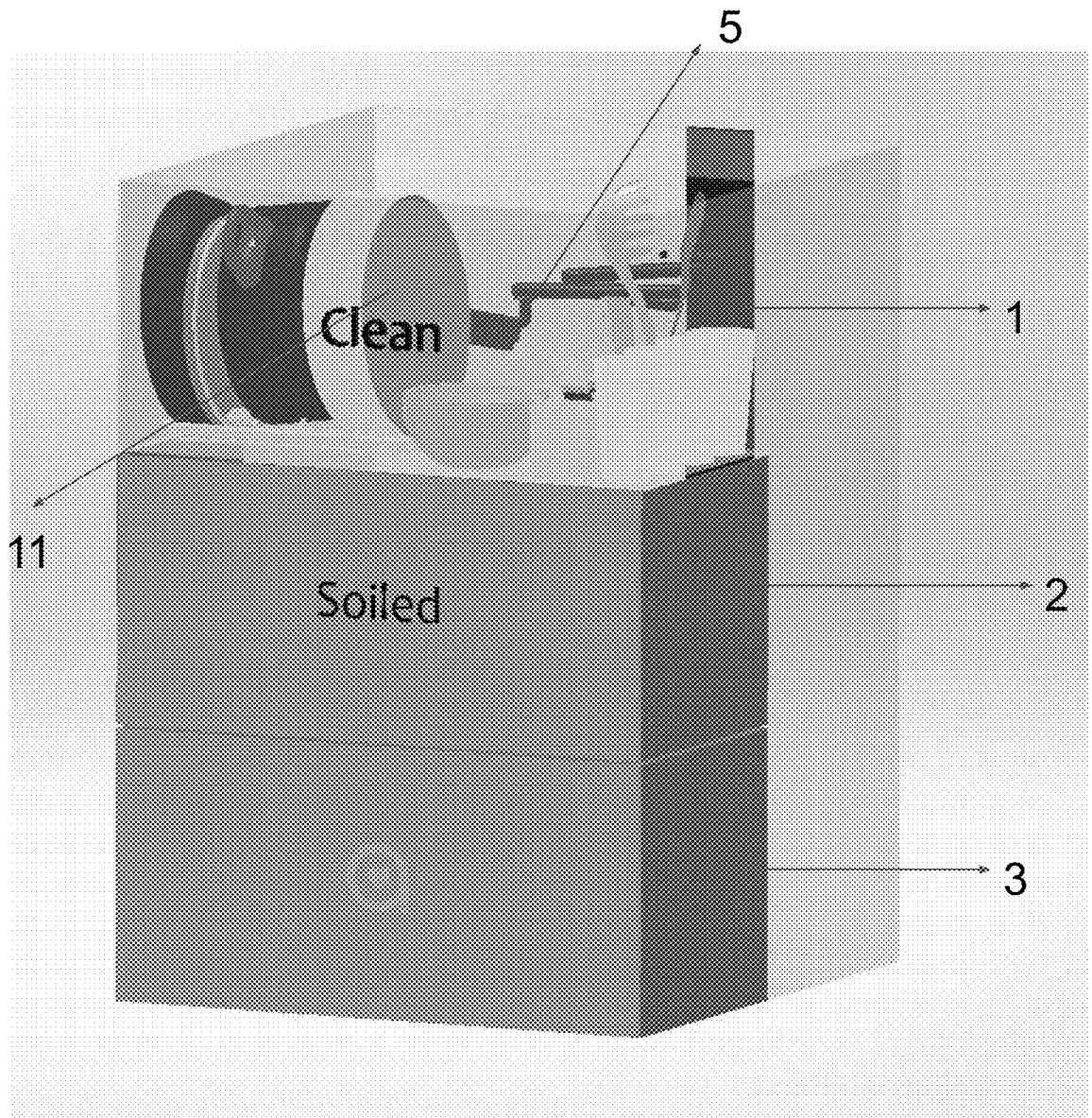
FIG. 3 shows a three-dimensional view of the robot replacing the now cleaned plate in the clean module from the wash module in an autonomous dishwasher, in accordance with the invention.

FIG. 3 shows a three-dimensional view of robotic arm 5 replacing the now cleaned plate 9 in clean module 1 from the wash module 3 in an autonomous dishwasher, in accordance with the invention. The front and side walls of clean module 1 are not shown, in order to reveal the internal details of the clean module.

Figure 4:
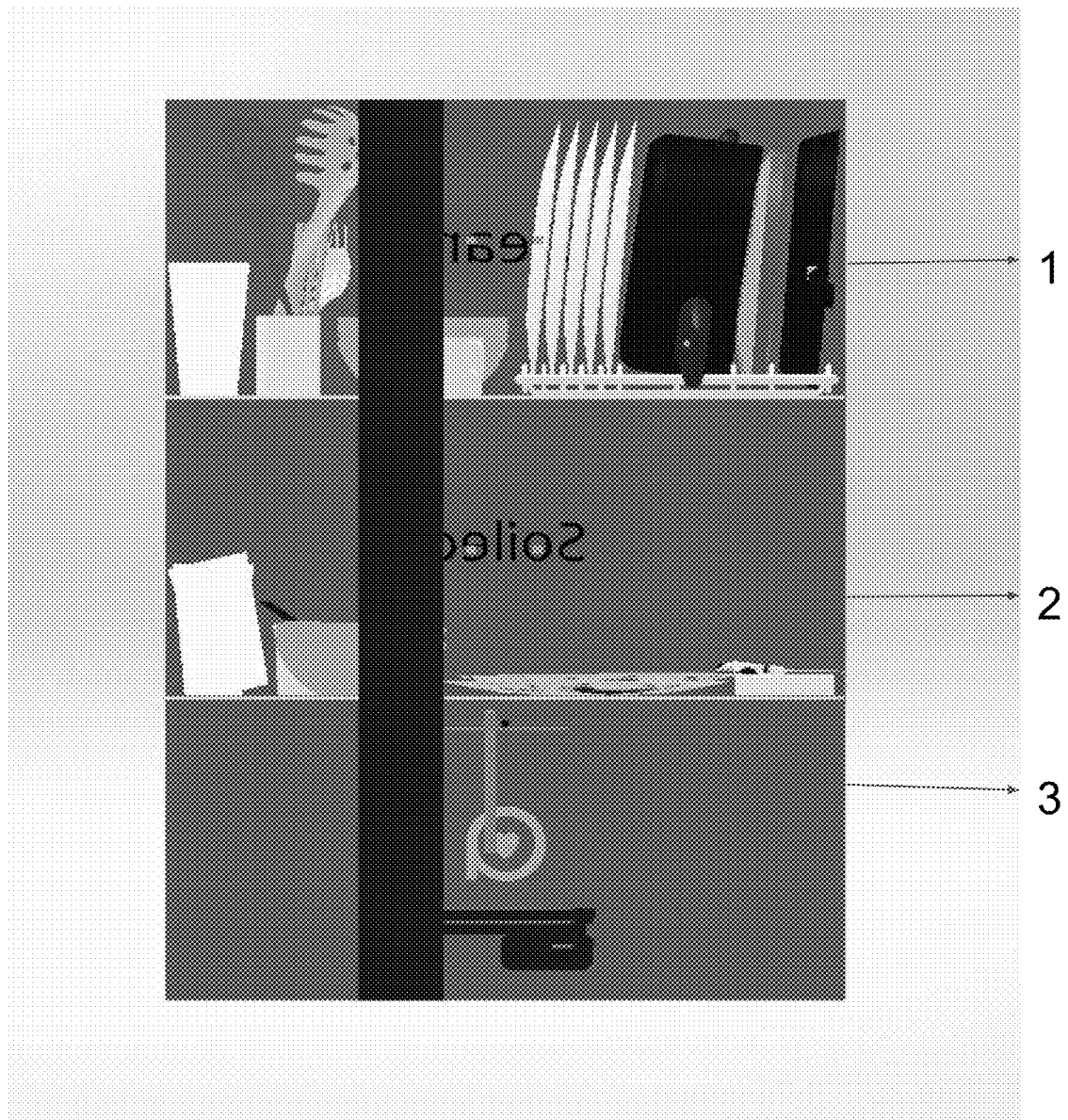
FIG. 4 shows a back view of an autonomous dishwasher having a vertical arrangement of clean module, soiled module, and wash module, in accordance with the invention.

FIG. 4 shows a back view of an autonomous dishwasher having a vertical arrangement of clean module 1, soiled module 2, and wash module 3, in accordance with the invention.

Figure 5:
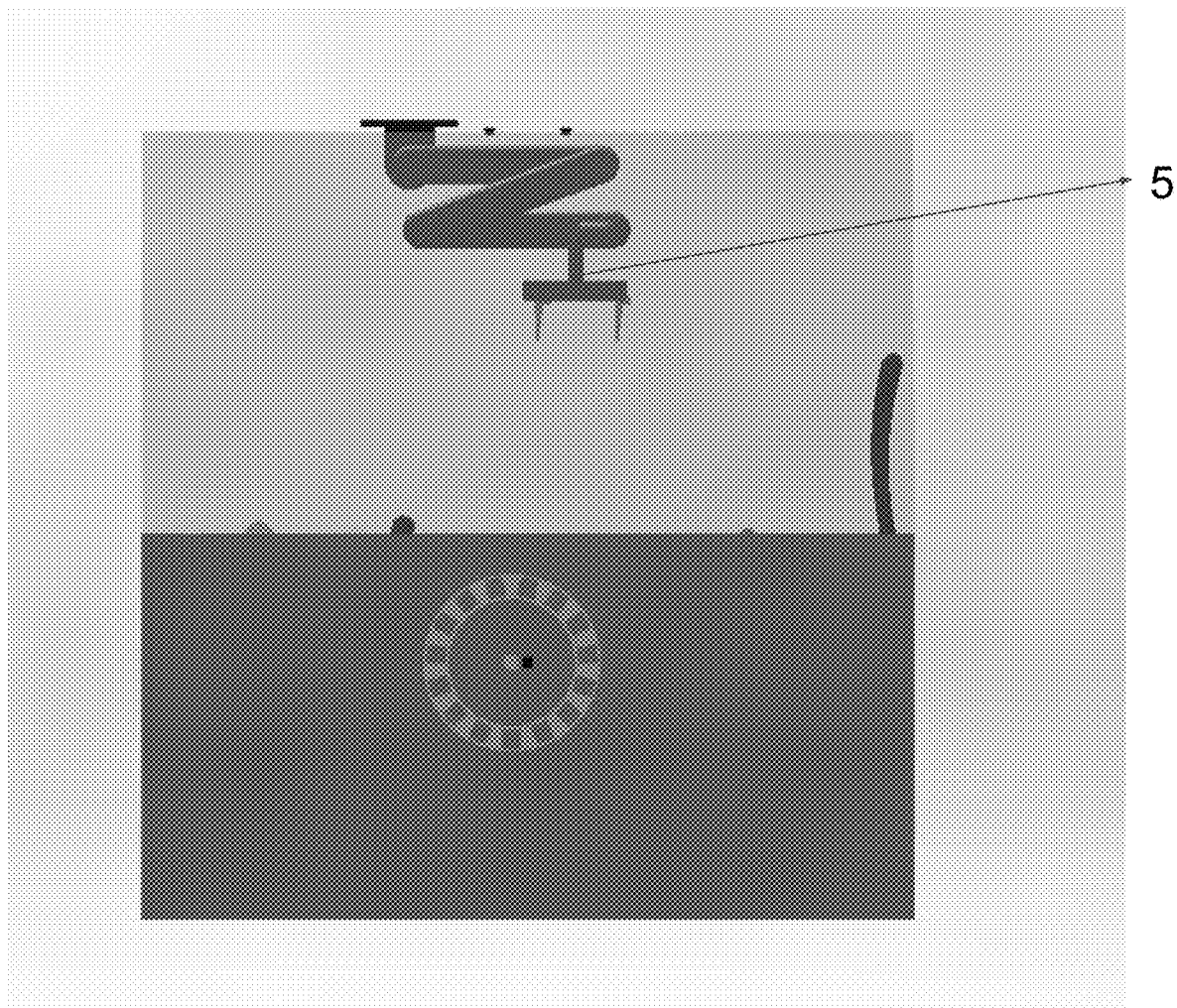
FIG. 5 shows a bottom view of an autonomous dishwasher having a vertical arrangement of clean module, soiled module, and wash module, in accordance with the invention.

FIG. 5 shows a bottom view of an autonomous dishwasher having a vertical arrangement of clean module 1, soiled module 2, and wash module 3, in accordance with the invention.

Figure 6:
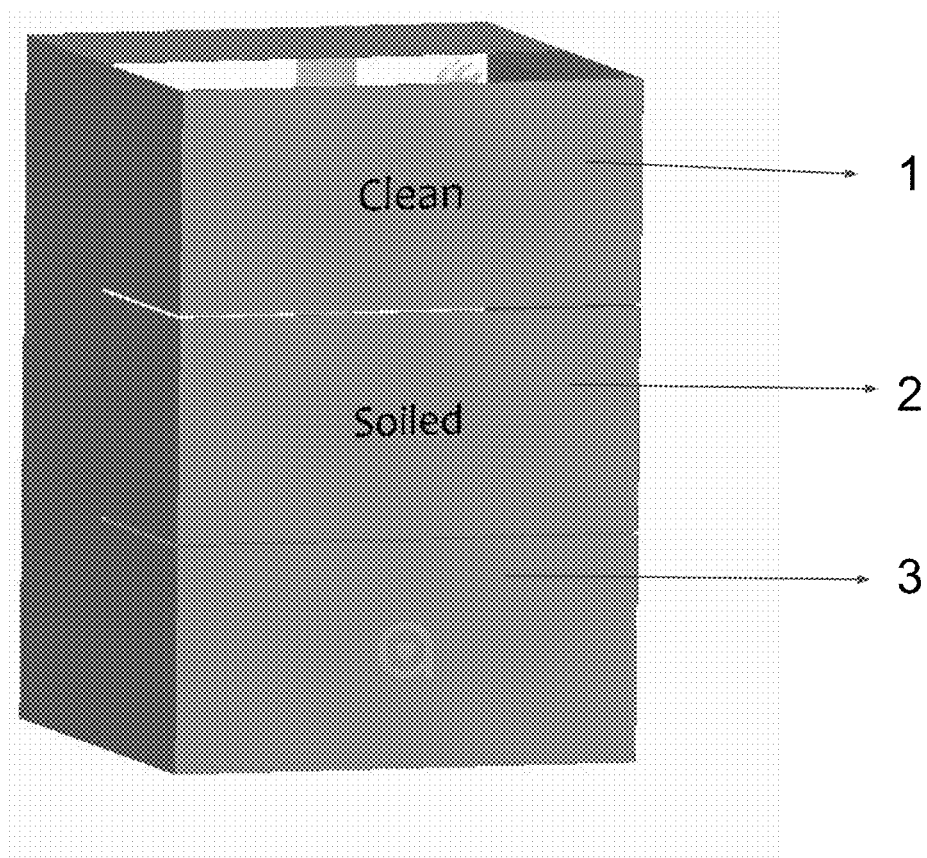
FIG. 6 shows a three-dimensional view of an autonomous dishwasher having a vertical arrangement of clean module, soiled module, and wash module, in accordance with the invention.

FIG. 6 shows a three-dimensional view of the different modules in an autonomous dishwasher designed to clean a dish, in accordance with the invention. In the autonomous dishwasher, the modules are vertically arranged in the following order: Clean module 1, soiled module 2 and wash module 3, respectively, in order to provide ease of access to the user. The soiled module is motorized for the purpose of raising the module to a particular level such that it can be raised to be at the same height as the clean module. This avoids the need for bending while dropping off dishes in the soiled module.

In some embodiments, the invention of the three module system in the particular arrangement is to provide ease of access to the user. The topmost module is the clean module 1 where the robot places the dishes after the wash cycle. It can be accessed anytime by the user. Below the clean module is the module to drop off soiled dishes. However, the user does not need to bend down to that level in order to drop off the dishes. In some embodiments, the soiled module 2 is motorized in such a way that when required, it opens up and elevates itself to the height same as the clean module. Once loaded, the soiled module lowers back to its original position and closes.

In some embodiments, a first module pulls out, rises in height, lowers in height, and pulls back in, wherein a dish is loaded or unloaded after the first module rises in height. In some embodiments, a second module pulls out and pulls back in, wherein said article is loaded or unloaded after said second module pulls out. Both the first and the second modules are configured for holding dishes. In some embodiments, the first module, the second module and the wash module are arranged vertically. In some embodiments, the first module, the second module and the wash module are arranged vertically under the kitchen countertop. In some embodiments, the dimensions of the vertically stacked first, second and wash modules are substantially similar to the dimensions of a conventional dishwasher. In some embodiments, the first module holds a soiled dish and the second module holds a clean dish. In other embodiments, the first module holds a clean dish and the second module holds a soiled dish.

The soiled module comprises different kinds of dishes that need to be cleaned prior to reuse. A dish is an article that makes contact with food or a drink while preparing, serving, consuming, or storing food or a drink. For example, dishes include silverware, plates, bowls, cups, and mugs. Silverware includes spoons, forks, knives, and chopsticks. Dishes also include pots, pans, and other kitchen utensils used for preparing, serving, or storing food.

In some embodiments, soiled dishes of a particular kind are stacked on top of each other to conserve space. For example, soiled plates are stacked on top of other soiled plates. Similarly, soiled bowls may be stacked on top of other soiled bowls. In other embodiments, soiled dishes are placed individually on the floor of the soiled module. For example, soiled mugs and cups may not be stacked and be placed on the floor of the soiled module. In some embodiments, soiled dishes of different kinds may be stacked on top of each other. For example, a soiled bowl may be placed on top of a soiled plate. Similarly, a soiled spoon may be placed inside a bowl.

In some embodiments, soiled dishes of a particular kind are placed in a predetermined location designated for the kind inside the soiled module 2. For example, soiled plates may be placed in one predetermined location and soiled bowls may be placed in another predetermined location. To facilitate the above, such embodiments have the means to indicate the preferred location and orientation of a dish of a particular kind. For instance, indications include text, drawings, or other visible structures of names or shapes of dishes of different kinds. In other embodiments, soiled dishes of any kind may be placed anywhere within the soiled module 2.

In some embodiments, soiled dishes in the soiled module 2 are oriented right side up to avoid spilling of materials that need to be removed prior to reuse. For example, a bowl with some leftover soup is placed right-side-up to avoid spilling the soup within the soiled module 2. In other embodiments, soiled dishes in the soiled module 2 are placed with any orientation regardless of concerns of spilling of material that needs to be removed prior to reuse. In such embodiments, material spilled is collected and removed from the soiled module 2 using water, soap, and a liquid pump.

In some embodiments, the soiled module 2 is motorized in such a way that when required, it opens up and elevates itself to the height same as the clean module. The loaded soiled module retrieves back to its original position and closes. In some embodiments, the soiled module comprises a camera or a sensor to detect when a soiled dish is placed inside the soiled module. In some embodiments, the soiled module comprises a camera to record at least one image of a soiled dish. The image of the soiled dish is then processed with a processor to detect, identify, and localize the position and orientation of the soiled dish. The position and orientation information of a soiled dish is required to facilitate picking the soiled dish up from the soiled module.

The wash module 3 has the means to transform a soiled dish into a clean dish. A clean dish is a dish that does not exhibit any material that needs to be removed prior to the reuse of the dish. In some embodiments, wash module 3 uses a combination of pressurized water, soap, and rinse agent to clean a soiled dish.

In some embodiments, wash module 3 comprises a camera 12 to record at least one image of a dish. The image of the dish is then processed with a processor to inspect for the presence of dirt before, during, or after cleaning of the dish. Such inspection is used to provide the feedback necessary to adapt the cleaning process based on the amount of dirt present in the dish. For instance, if the inspection determines that dirt is present predominantly in specific regions of a dish, then the cleaning process is adapted to focus on removing dirt from those specific regions. In another instance, if no dirt is detected on a dish during a cleaning process, then not much resources are spent on cleaning the dish.

In some embodiments, a dish in wash module 3 is oriented to avoid holding of material that needs to be removed prior to reuse or holding of any material used for cleaning. For instance, a soiled bowl may be held upside down to facilitate rapid disposal of food or drink, soap, rinse agent, and water. In some embodiments, wash module 3 cleans all sides of a soiled dish simultaneously. For instance, the front side and the backside of a soiled plate or a bowl are cleaned simultaneously. In other embodiments, wash module 3 cleans one side of the soiled dish at one time and another side of the soiled dish subsequently. For instance, in such embodiments, the front side and the backside of a soiled plate or a soiled bowl are cleaned at different times, one after another.

The robotic arm 5 comprises a robotic arm configured to pick up a soiled dish from the soiled module 2 and transport the soiled dish from soiled module 2 to wash module 3. Once the soiled dish is cleaned by the wash module 3, the robotic arm transports the clean dish from wash module 3 to clean module 1 and drops off the clean dish in the same.

In some embodiments, the robotic arm 5 comprises an end effector to grasp a plurality of articles. In some embodiments, the robotic arm comprises a plurality of degrees of freedom to position its end effector to move a dish from one spatial 3D position to another spatial 3D position. In some embodiments, the robotic arm comprises a plurality of degrees of freedom to position its end effector to move a dish from one 3D orientation to another 3D orientation. In some embodiments, the robotic arm rotates a dish. The robotic arm comprises enough degrees of freedom to position its end effector to pick up a dish from the soiled module 2, hold the dish while transporting it from one module to another, and drop off the dish in clean module 1. In some embodiments, the robotic arm turns the orientation of a dish from right-side-up orientation to an upside-down orientation. In some embodiments, the robotic arm can position its end effector at multiple locations with multiple orientations inside the clean, soiled, and wash modules. In some embodiments, the robotic arm comprises 7 degrees of freedom: 6 revolute joints and 1 prismatic joint, in addition to the end effector with 3 degrees of freedom: 1 prismatic joint and 2 continuous joints. In some embodiments, the robotic arm comprises 6 degrees of freedom: 3 prismatic joints and 3 revolute joints. In other embodiments, the robotic arm comprises 3 degrees of freedom: 3 prismatic joints. In some embodiments, the robotic arm comprises 4 degrees of freedom: 3 prismatic joints and 1 revolute joint. In other embodiments, the robotic arm comprises 5 degrees of freedom: 3 prismatic joints and 2 revolute joints.

Figure 7:
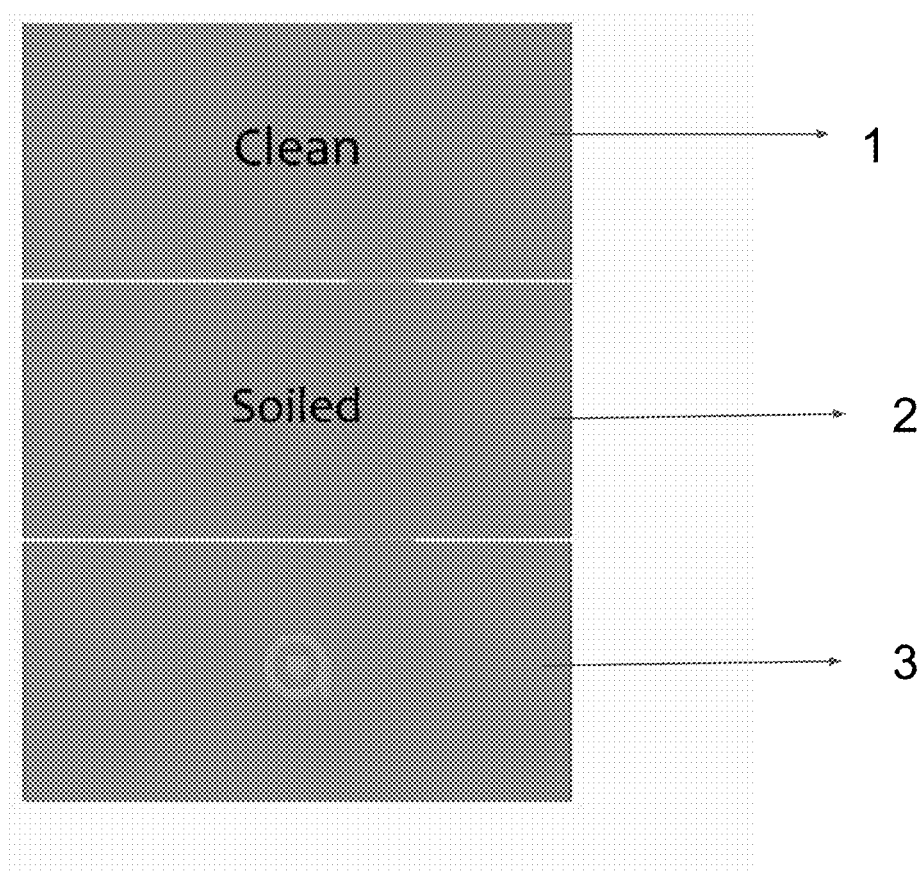
FIG. 7 shows a front view of an autonomous dishwasher having a vertical arrangement of clean module, soiled module, and wash module, in accordance with the invention.

FIG. 7 shows a front view of an autonomous dishwasher having a vertical arrangement of clean module 1, soiled module 2, and wash module 3, in accordance with the invention.

Figure 8:
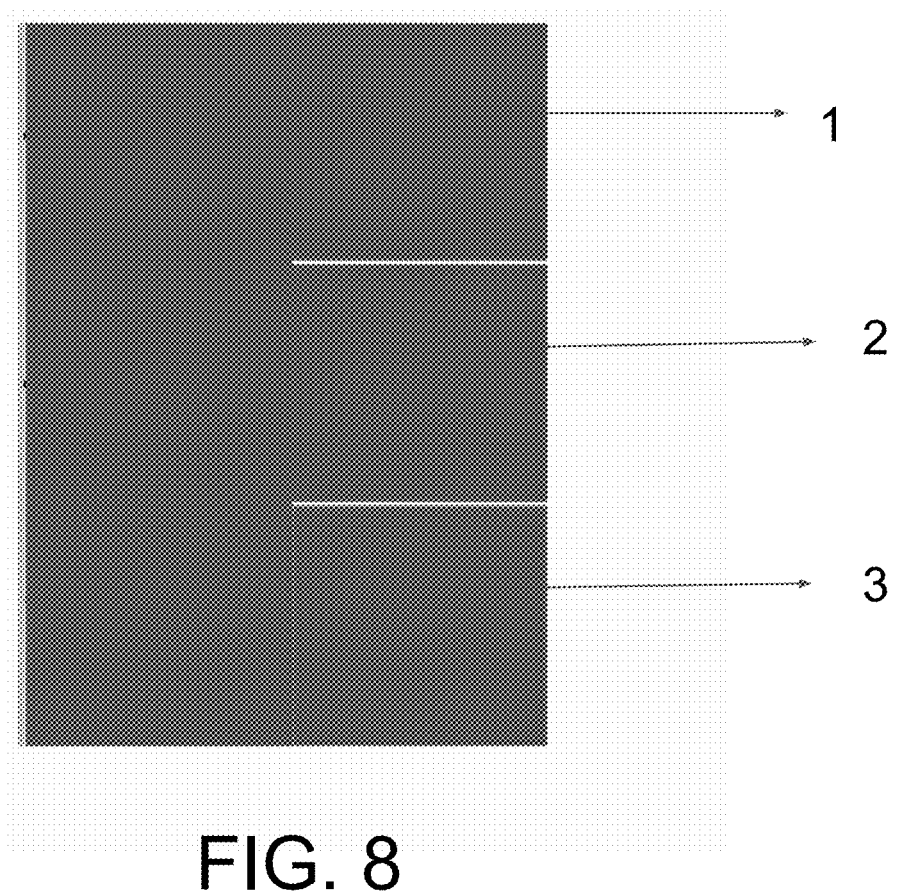
FIG. 8 shows a right-side view of an autonomous dishwasher having a vertical arrangement of clean module, soiled module, and wash module, in accordance with the invention.

FIG. 8 shows a right-side view of an autonomous dishwasher having a vertical arrangement of clean module 1, soiled module 2, and wash module 3, in accordance with the invention.

Figure 9:
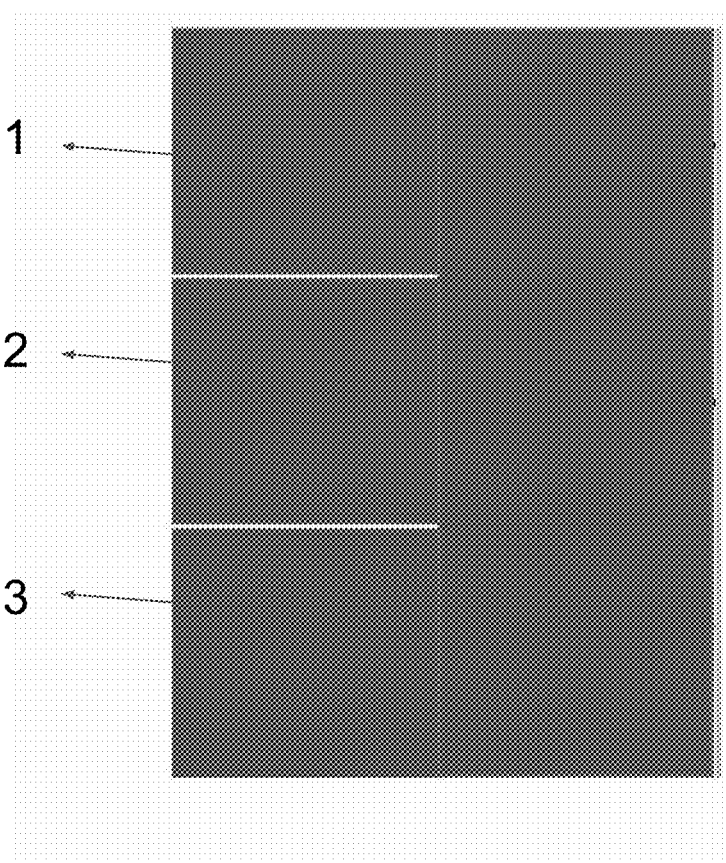
FIG. 9 shows a left-side view of an autonomous dishwasher having a vertical arrangement of clean module, soiled module, and wash module, in accordance with the invention.

FIG. 9 shows a left-side view of an autonomous dishwasher having a vertical arrangement of clean module 1, soiled module 2, and wash module 3, in accordance with the invention.

Figure 10:
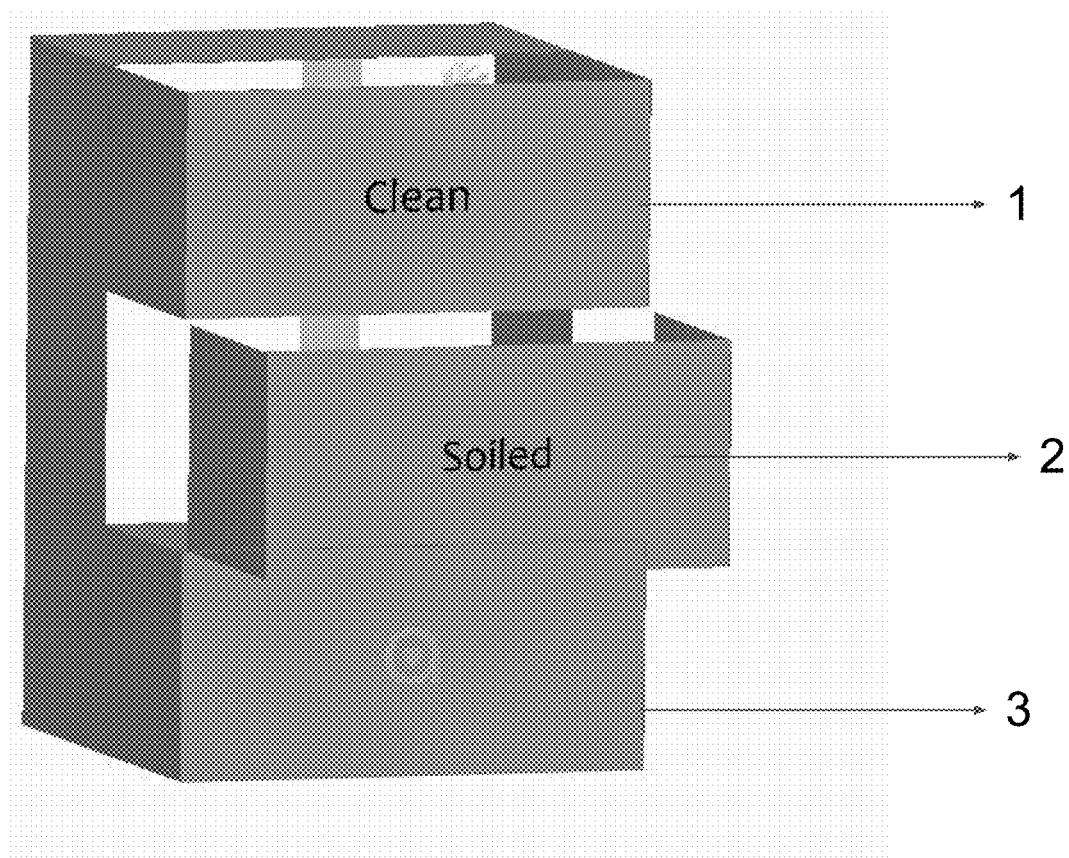
FIG. 10 shows a three-dimensional view of an open soiled module in an autonomous dishwasher, in accordance with the invention.

FIG. 10 shows a three-dimensional view of an open soiled module 1 in an autonomous dishwasher, in accordance with the invention.

Figure 11:
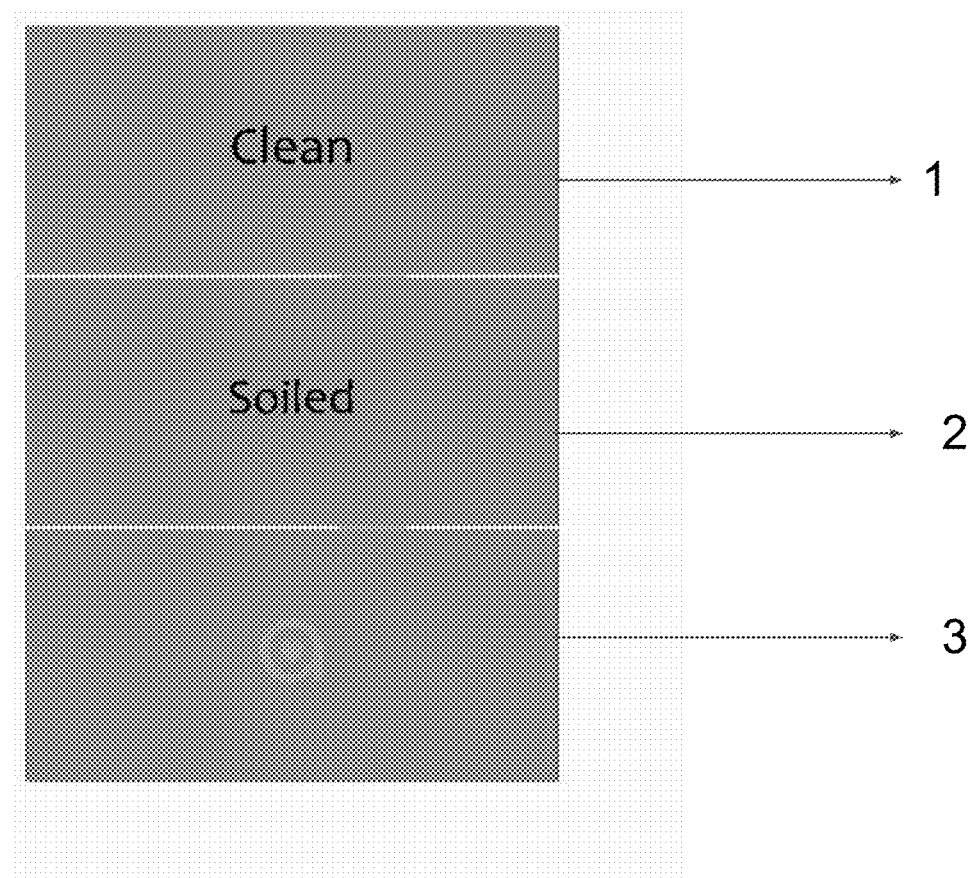
FIG. 11 shows a front view of an open soiled module in an autonomous dishwasher, in accordance with the invention.

FIG. 11 shows a front view of an open soiled module 1 in an autonomous dishwasher, in accordance with the invention.

Figure 12:
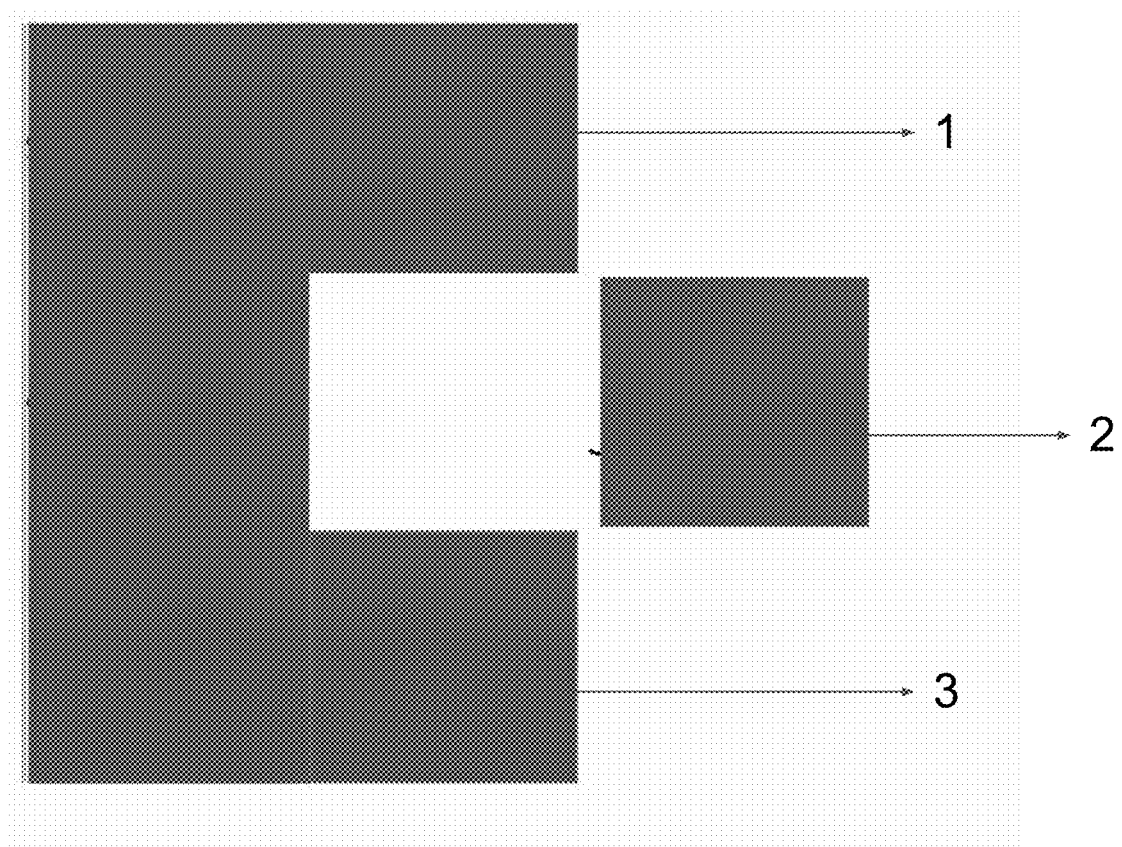
FIG. 12 shows a right-side view of an open soiled module in an autonomous dishwasher, in accordance with the invention.

FIG. 12 shows a right-side view of an open soiled module 1 in an autonomous dishwasher, in accordance with the invention.

Figure 13:
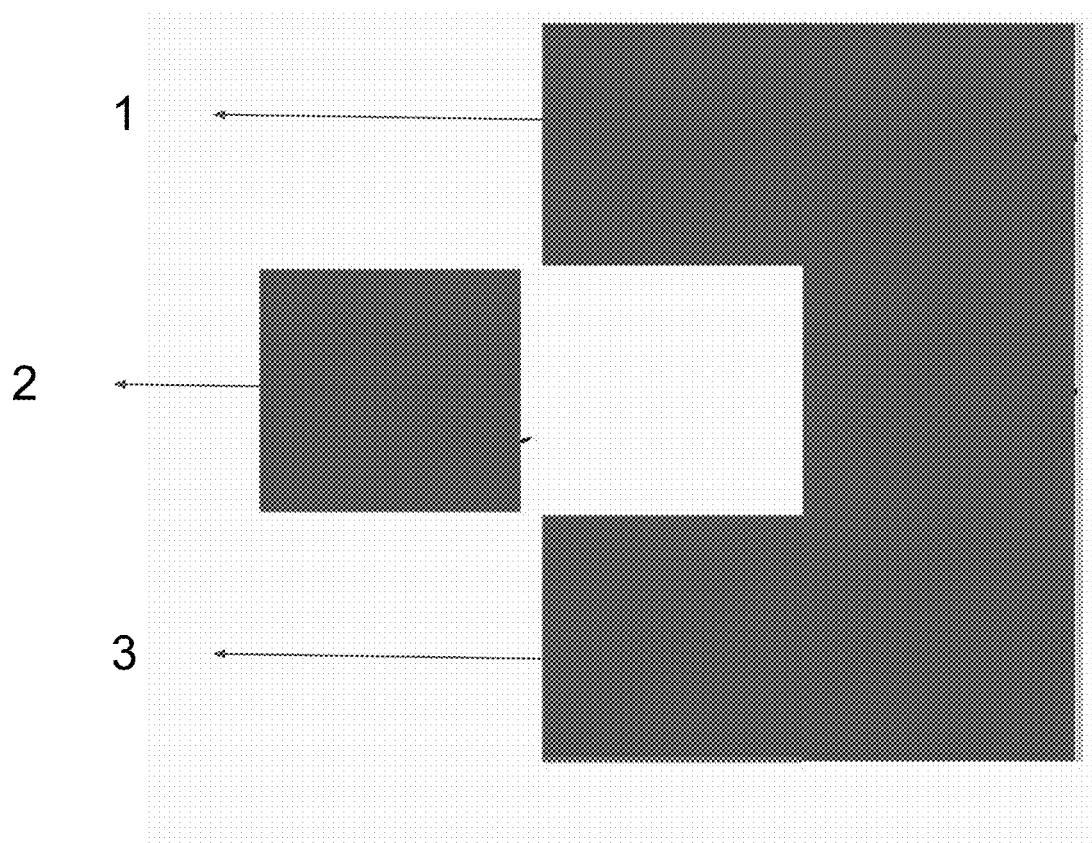
FIG. 13 shows a left-side view of an open soiled module in an autonomous dishwasher, in accordance with the invention.

FIG. 13 shows a left-side view of an open soiled module 1 in an autonomous dishwasher, in accordance with the invention.

Figure 14:
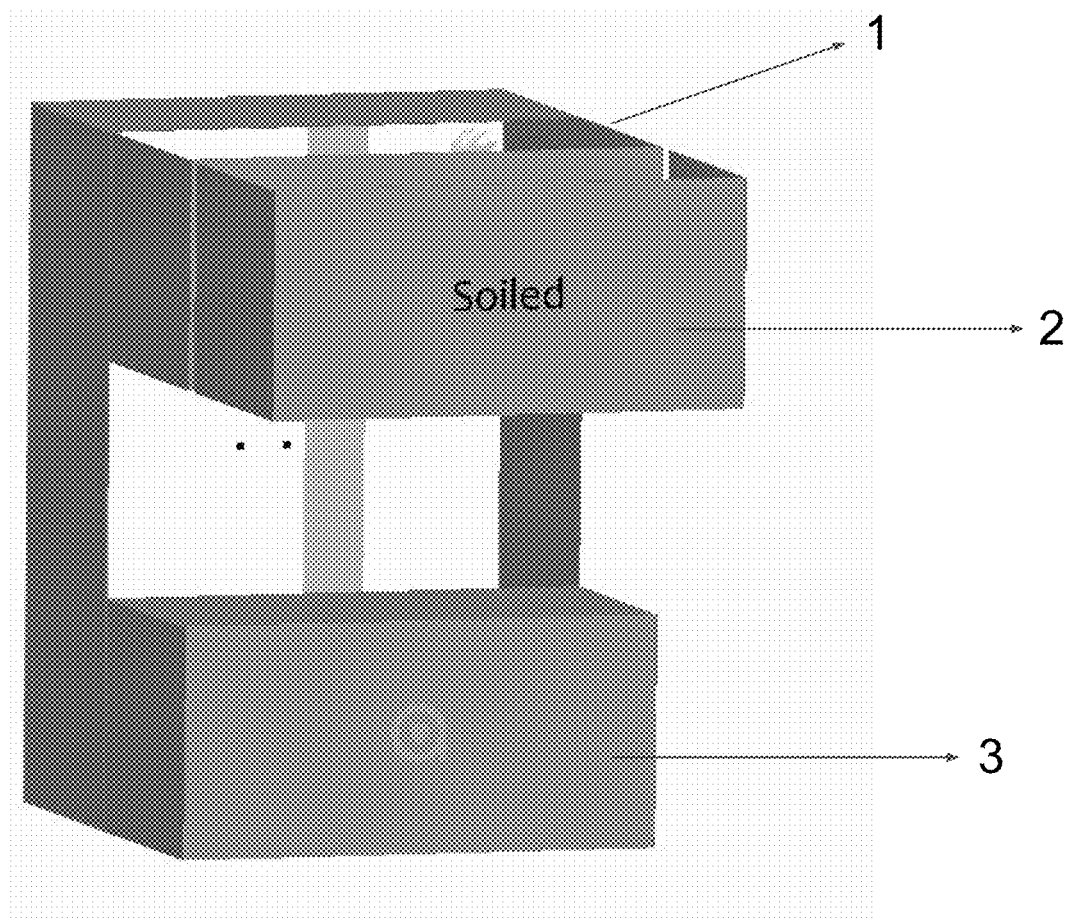
FIG. 14 shows a three-dimensional view of an elevated soiled module in an autonomous dishwasher, in accordance with the invention.

FIG. 14 shows a three-dimensional view of an elevated soiled module 1 in an autonomous dishwasher, in accordance with the invention.

Figure 15:
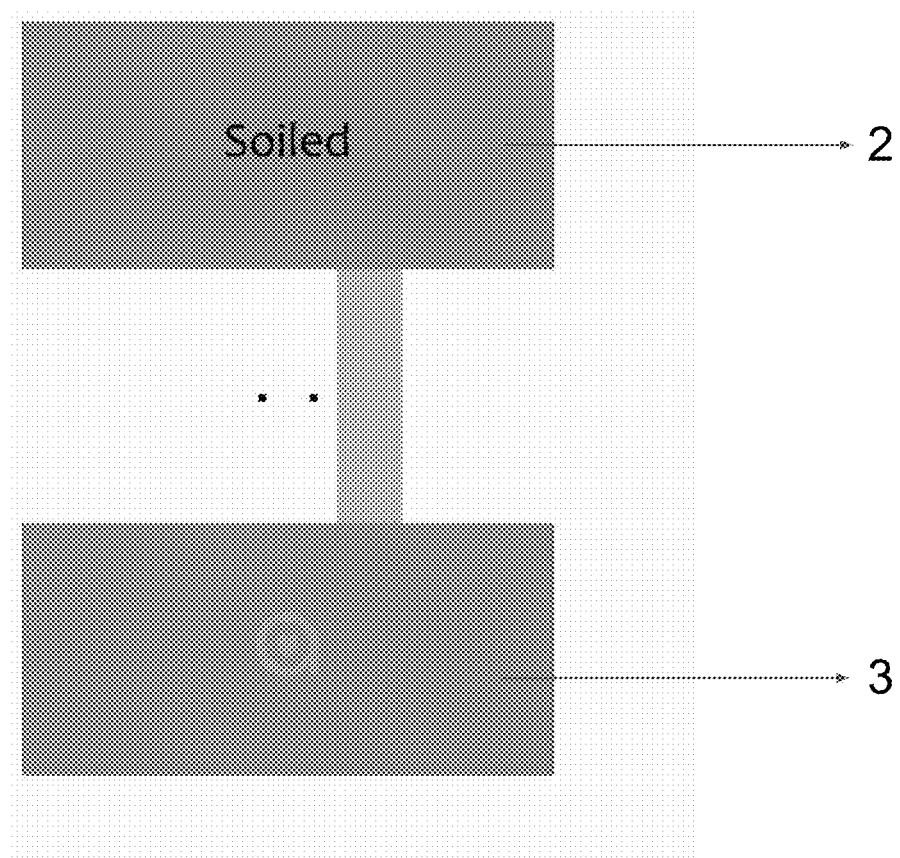
FIG. 15 shows a front view of an elevated soiled module in an autonomous dishwasher, in accordance with the invention.

FIG. 15 shows a front view of an elevated soiled module 1 in an autonomous dishwasher, in accordance with the invention.

Figure 16:
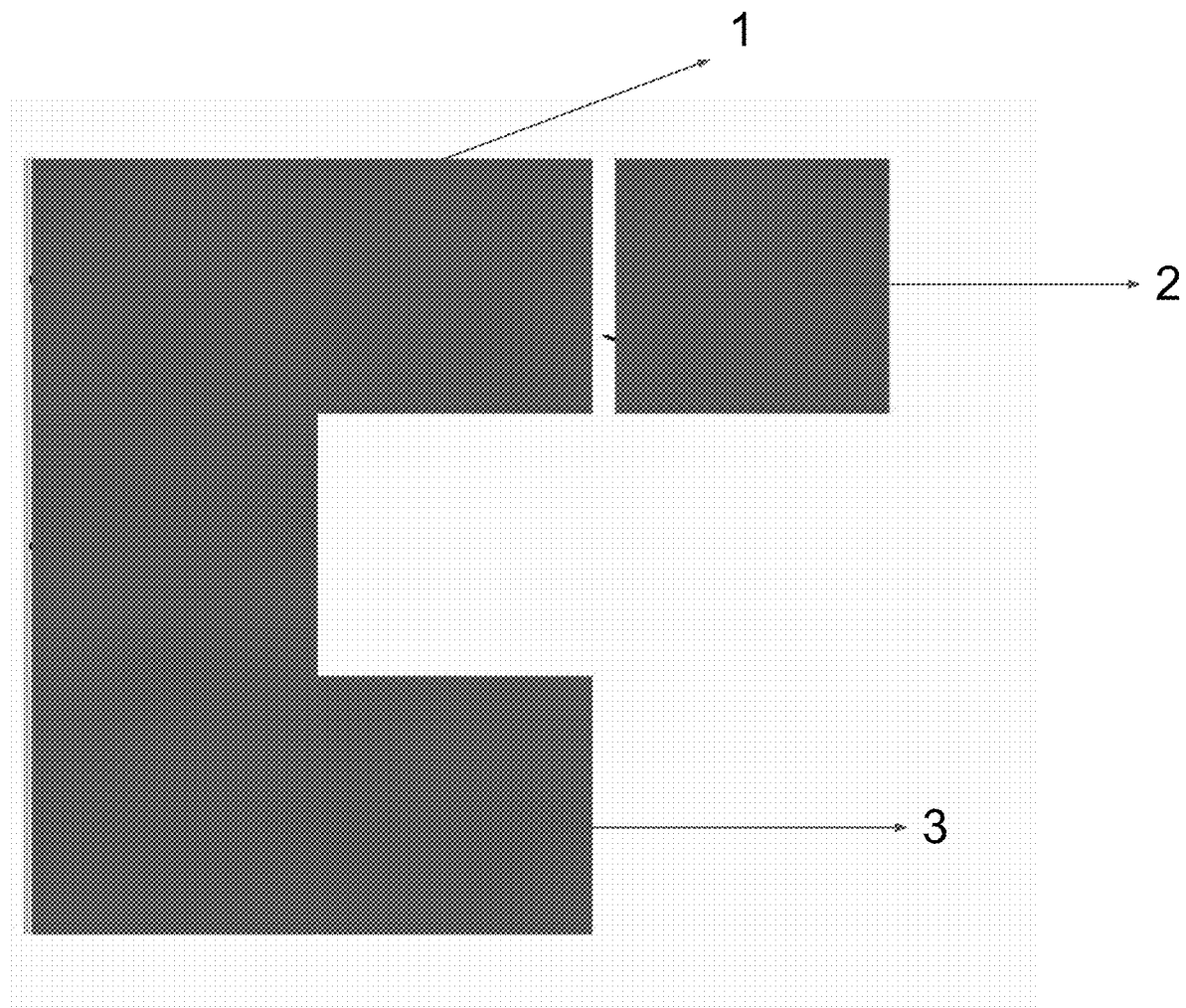
FIG. 16 shows a right-side view of an elevated soiled module in an autonomous dishwasher, in accordance with the invention.

FIG. 16 shows a right-side view of an elevated soiled module 1 in an autonomous dishwasher, in accordance with the invention.

Figure 17:
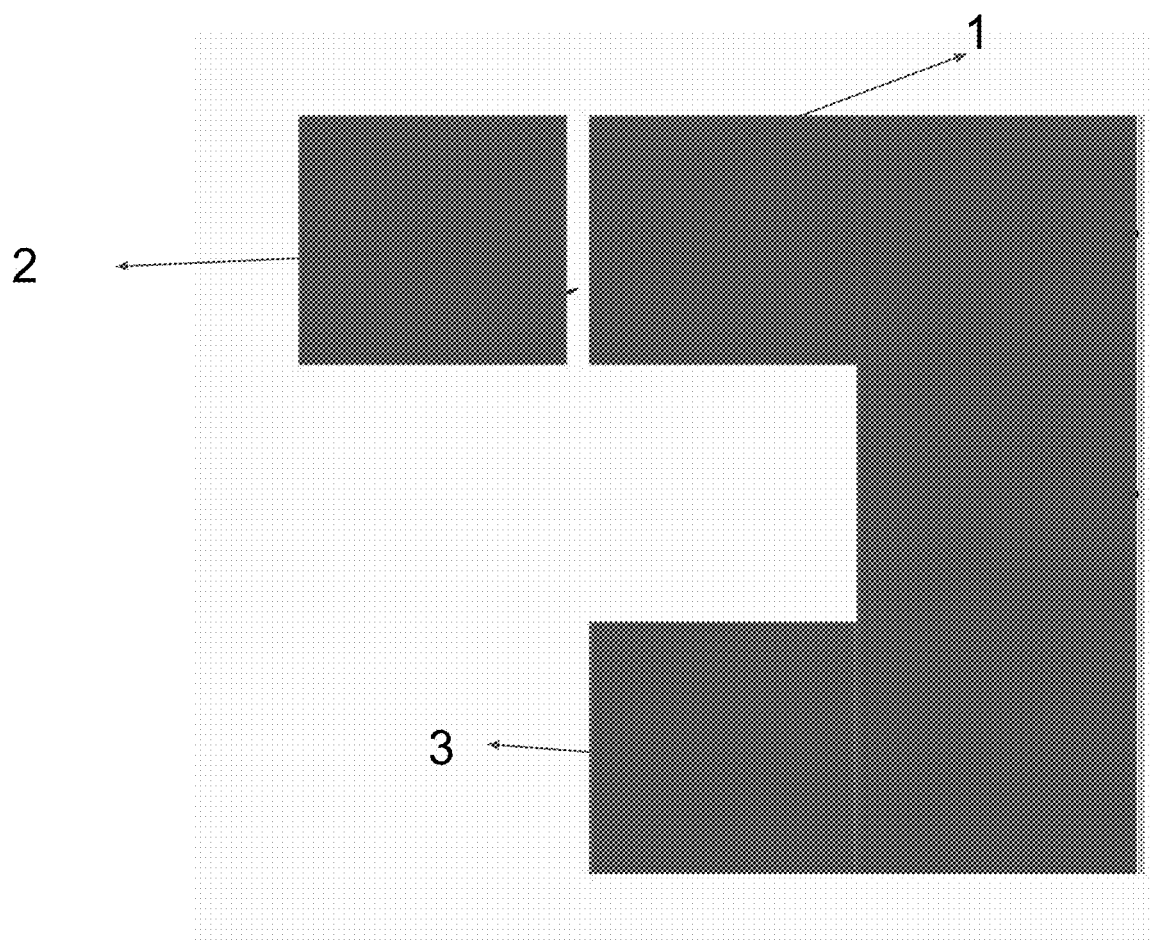
FIG. 17 shows a left-side view of an elevated soiled module in an autonomous dishwasher, in accordance with the invention.

FIG. 17 shows a left-side view of an elevated soiled module 1 in an autonomous dishwasher, in accordance with the invention.

Figure 18:
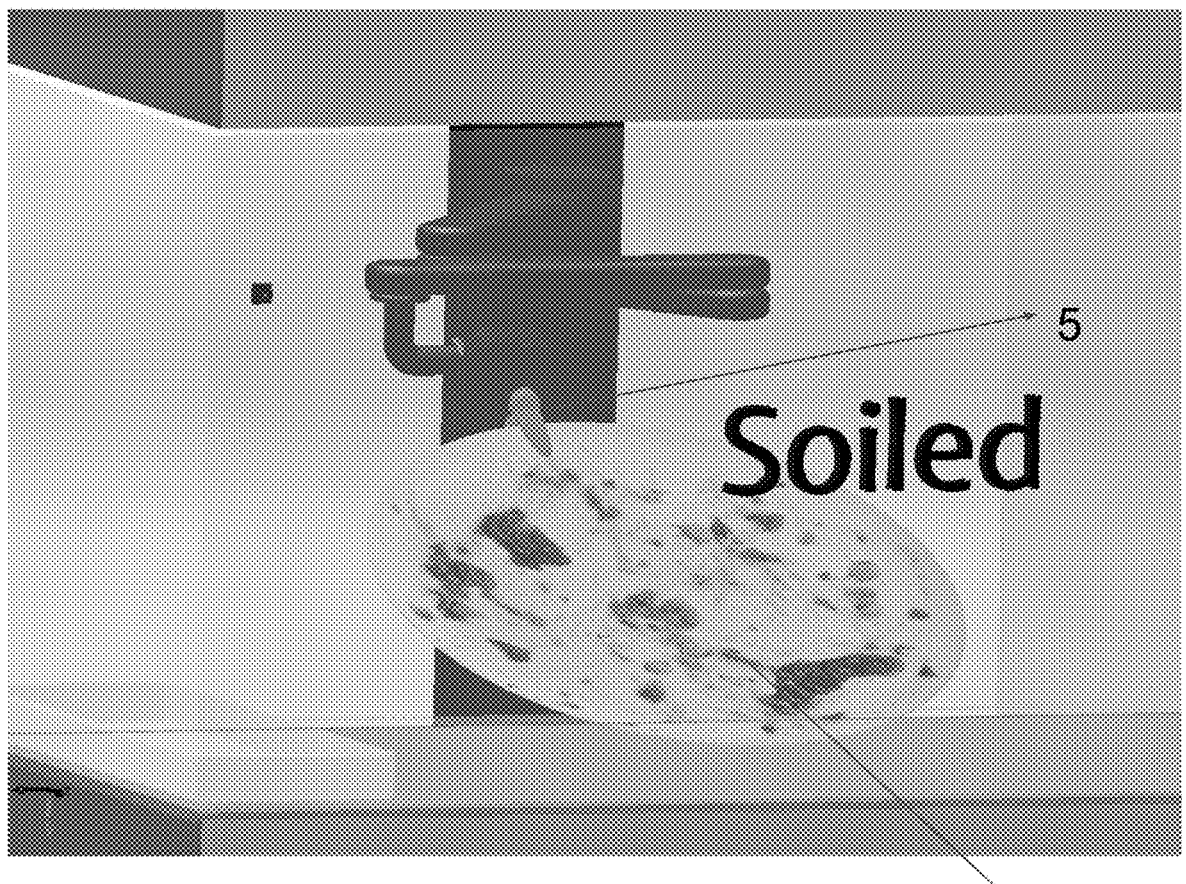
FIG. 18 shows a three-dimensional close-up view of a dish handling robot picking up a soiled plate from the soiled module, in accordance with the invention.

FIG. 18 shows a three-dimensional close-up view of a dish handling robotic arm 5 picking up a soiled plate 4 from the soiled module 2, in accordance with the invention.

In some embodiments, the robot picks up the soiled dish from the soiled module 2 and takes it to the wash module 3. Inside the wash module, there is a static nozzle 11 and one or more cameras 12 adjacent to the nozzle. In some embodiments, this camera 12 helps in localizing positions of soiled regions on a soiled dish 6. In some embodiments, a light located near the camera is used for illuminating the scene. In some embodiments, a light ring surrounds the camera. In some embodiments, locations of soiled regions are estimated using at least two images representing at least two different views of the dish. For example, by measuring the disparities of objects that are visible in multiple views and converting the disparity measurements to depth using stereo or multiple aperture calibration procedures. In other embodiments, locations of soiled regions are estimated using at least one image and a three-dimensional model of the dish.

In some embodiments, robotic arm 5 comprises a tapered finger for picking up the dish which is stacked together with another dish, wherein the tapered finger is inserted between the dish and the other dish with which it is stacked. In some embodiments, robotic arm 5 also comprises an end effector having at least two fingers, wherein the distance of separation between the two fingers is configured to grip the dish. The thickness of the tapered finger at the tip of the finger is smaller than the thickness of the finger near the end effector.

In some embodiments, the static nozzle system 11 can expel a fluid at different flow rates depending on the requirement of the cleaning process. In some embodiments, fluid refers to any liquid or gas used for cleaning and drying a dish. In some embodiments, fluid comprises clean water, recycled water, hot water, cold water, detergent, air, or rinse aid. With the combination of the movement of robotic arm 5 and the varying flow rates of the static nozzle system 11, the entire cleaning process is being carried out in wash module 3.

Figure 19:
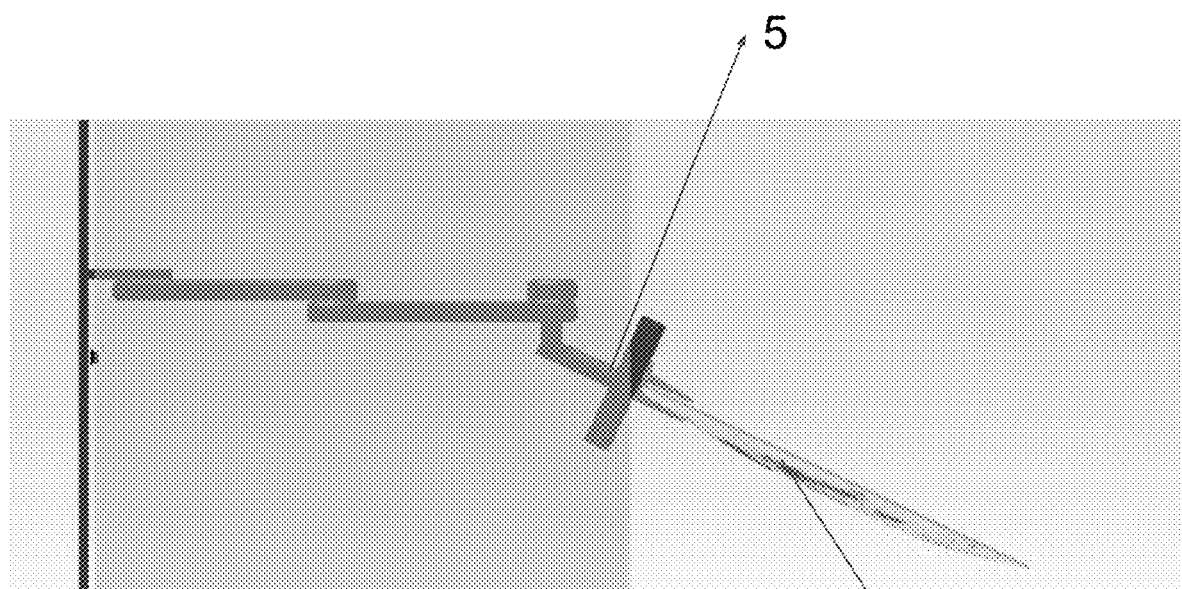
FIG. 19 shows a left-side close-up view of a dish handling robot picking up a soiled plate from the soiled module, in accordance with the invention.

FIG. 19 shows a left-side close-up view of a dish handling robotic arm 5 picking up a soiled plate 4 from the soiled module 2, in accordance with the invention.

Figure 20:
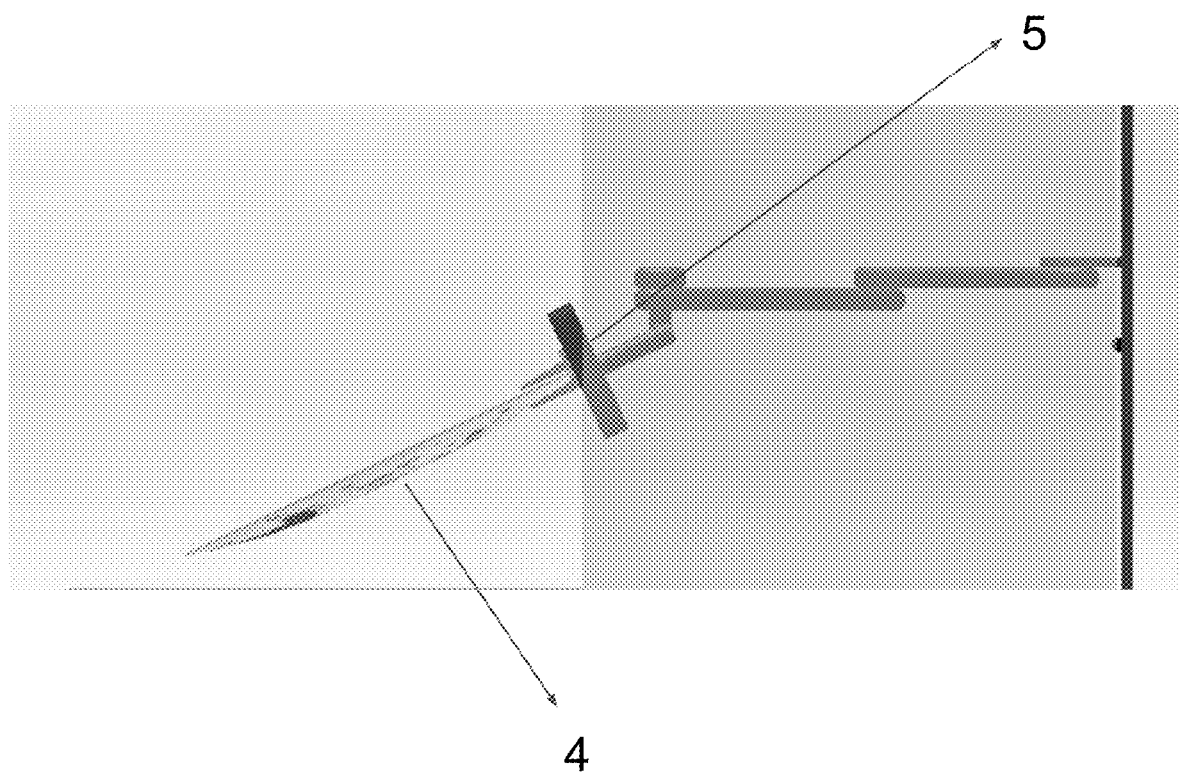
FIG. 20 shows a right-side close-up view of a dish handling robot picking up a soiled plate from the soiled module, in accordance with the invention.

FIG. 20 shows a right-side close-up view of a dish handling robotic arm 5 picking up a soiled plate 4 from the soiled module 2, in accordance with the invention.

Figure 21:
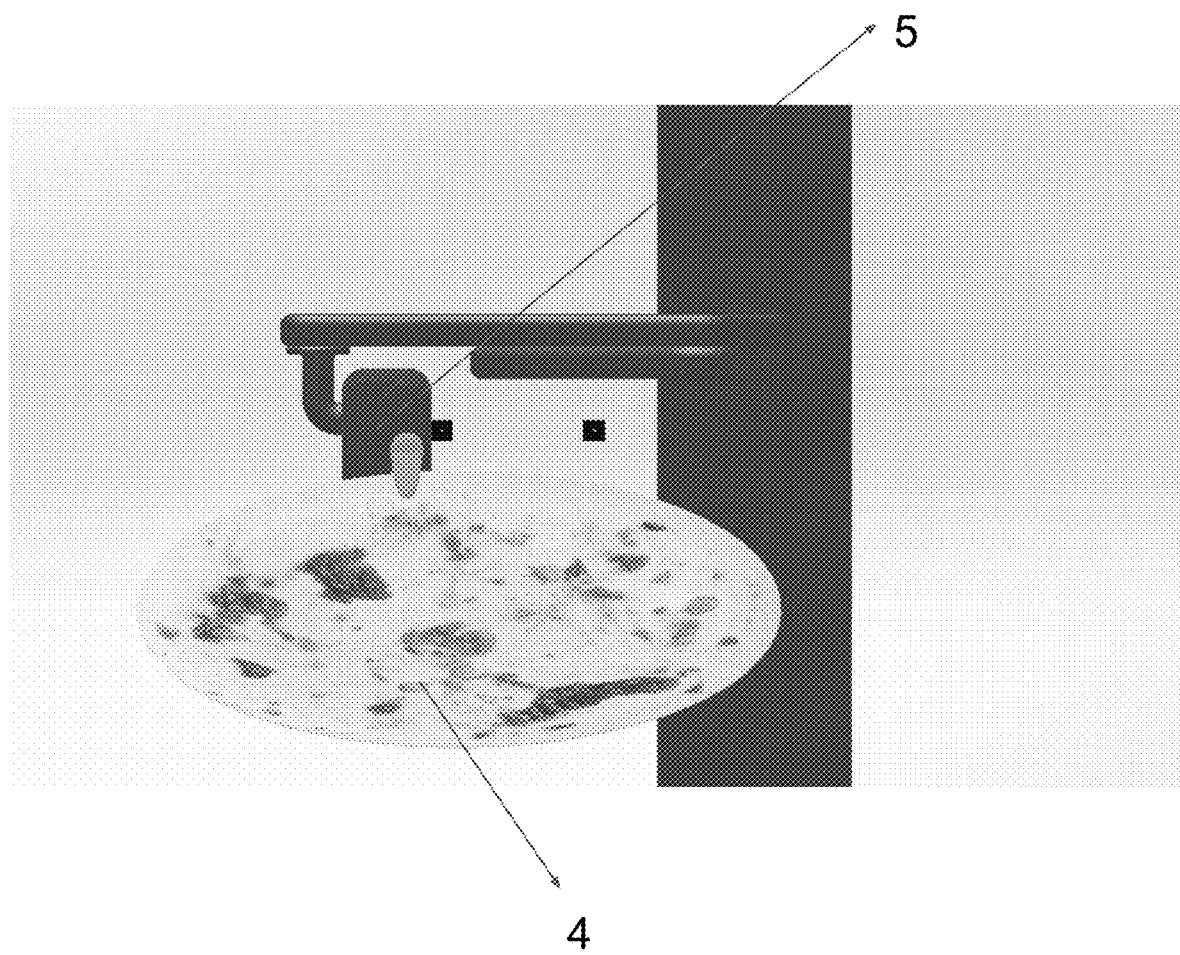
FIG. 21 shows a front close-up view of a dish handling robot picking up a soiled plate from the soiled module, in accordance with the invention.

FIG. 21 shows a front close-up view of a dish handling robotic arm 5 picking up a soiled plate 4 from the soiled module 1, in accordance with the invention.

Figure 22:
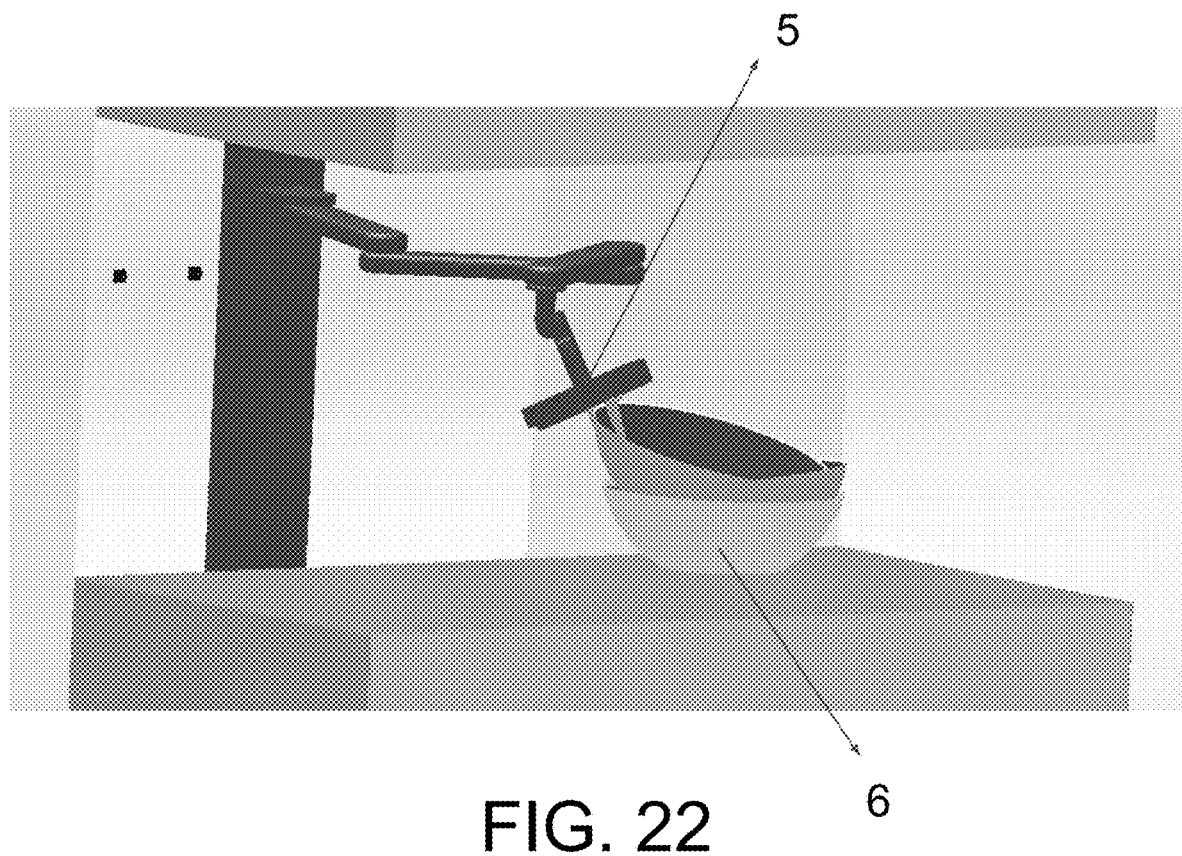
FIG. 22 shows a three-dimensional close-up view of a dish handling robot picking up a soiled bowl from the soiled module, in accordance with the invention.

FIG. 22 shows a three-dimensional close-up view of a dish handling robotic arm 5 picking up a soiled bowl 6 from the soiled module 1, in accordance with the invention.

Figure 23:
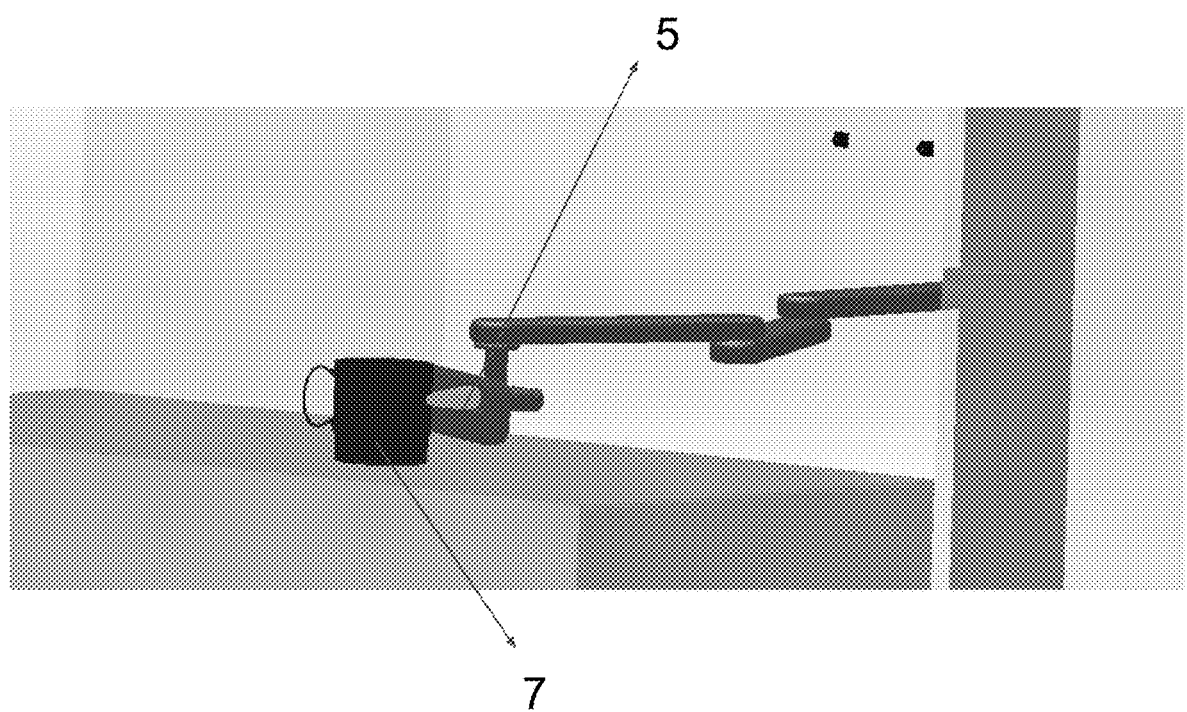
FIG. 23 shows a three-dimensional close-up view of a dish handling robot picking up a soiled mug from the soiled module, in accordance with the invention.

FIG. 23 shows a three-dimensional close-up view of a dish handling robotic arm 5 picking up a soiled mug 7 from the soiled module 1, in accordance with the invention.

Figure 24:
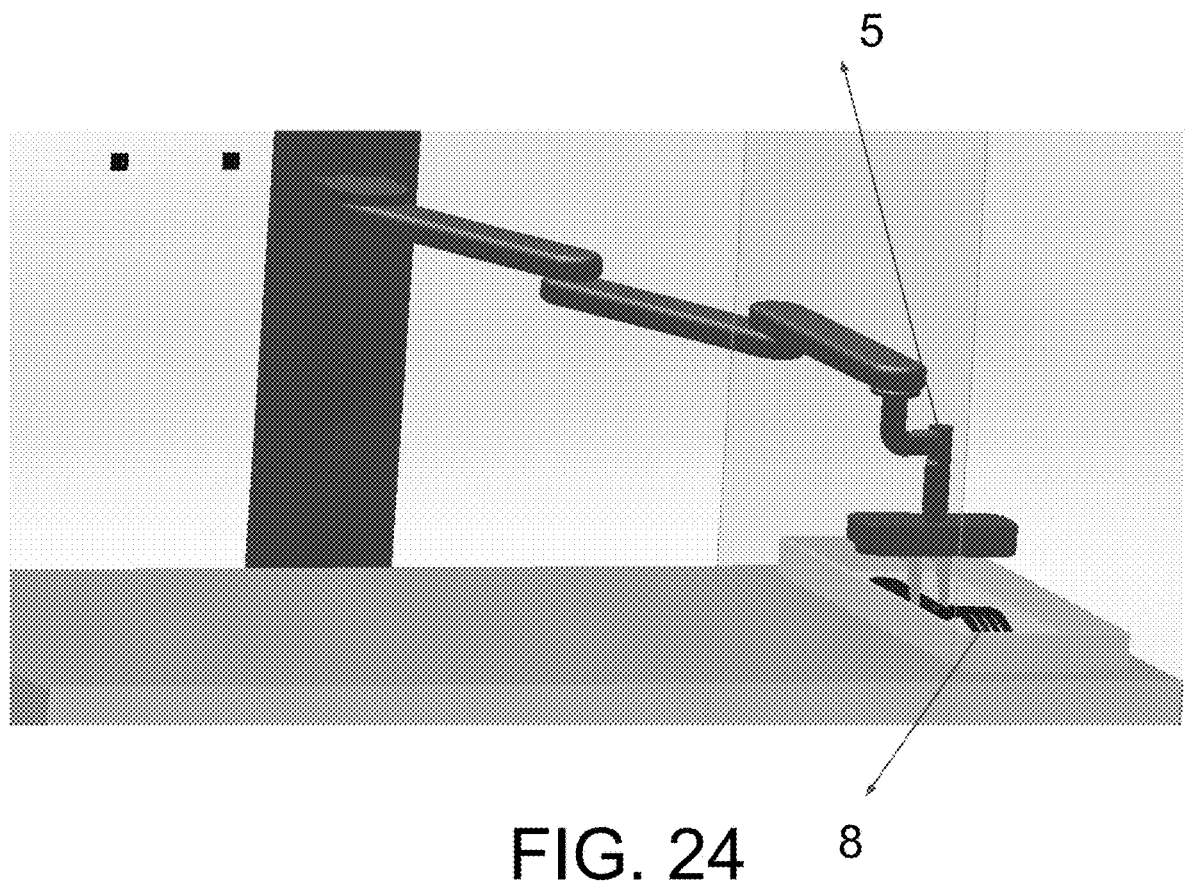
FIG. 24 shows a three-dimensional close-up view of a dish handling robot picking up a soiled fork from the soiled module, in accordance with the invention.

FIG. 24 shows a three-dimensional close-up view of a dish handling robotic arm 5 picking up a soiled fork 8 from the soiled module 1, in accordance with the invention.

Figure 25:
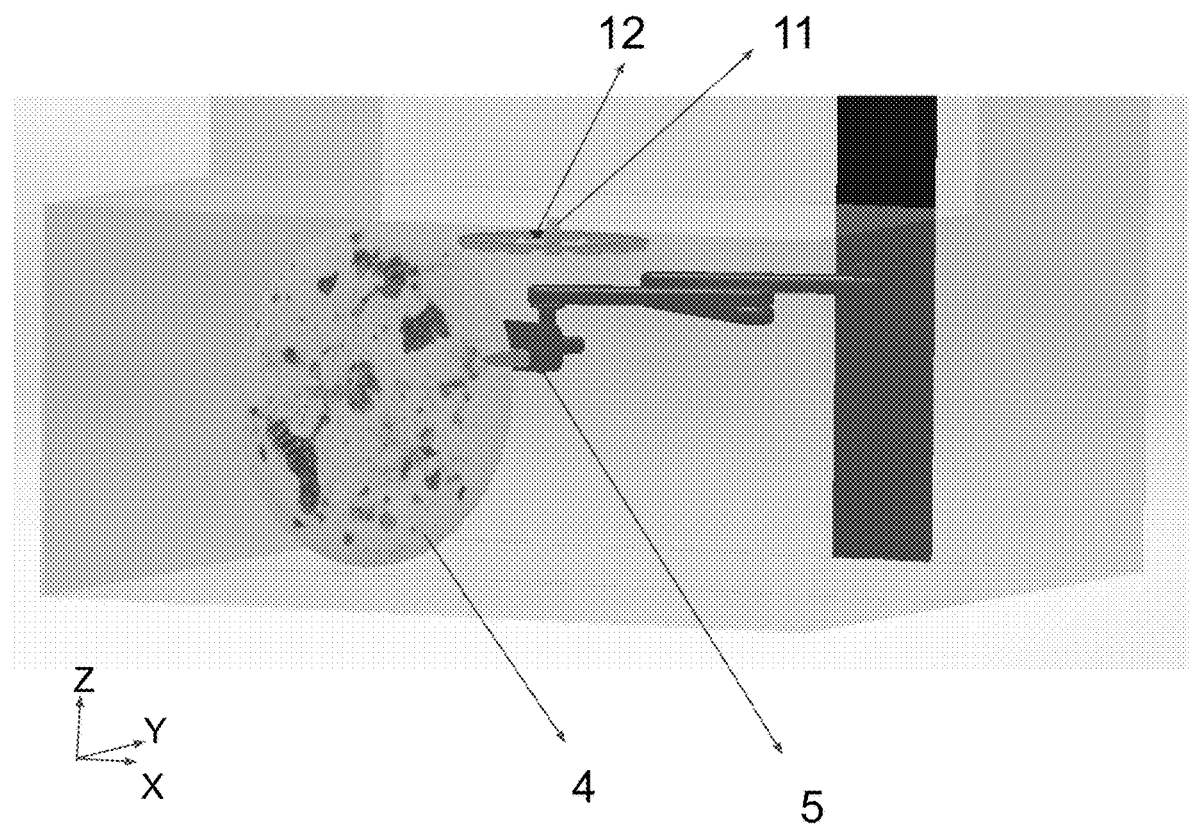
FIG. 25 shows a three-dimensional close-up view of a dish handling robot tilting a soiled plate by 90 degrees about the Y-axis in the wash module, in order to get it cleaned, in accordance with the invention.

FIG. 25 shows a three-dimensional close-up view of a dish handling robotic arm 5 tilting a soiled plate 4 by 90 degrees about the Y-axis in the wash module 3, in order to get it cleaned, in accordance with the invention.

Figure 26:
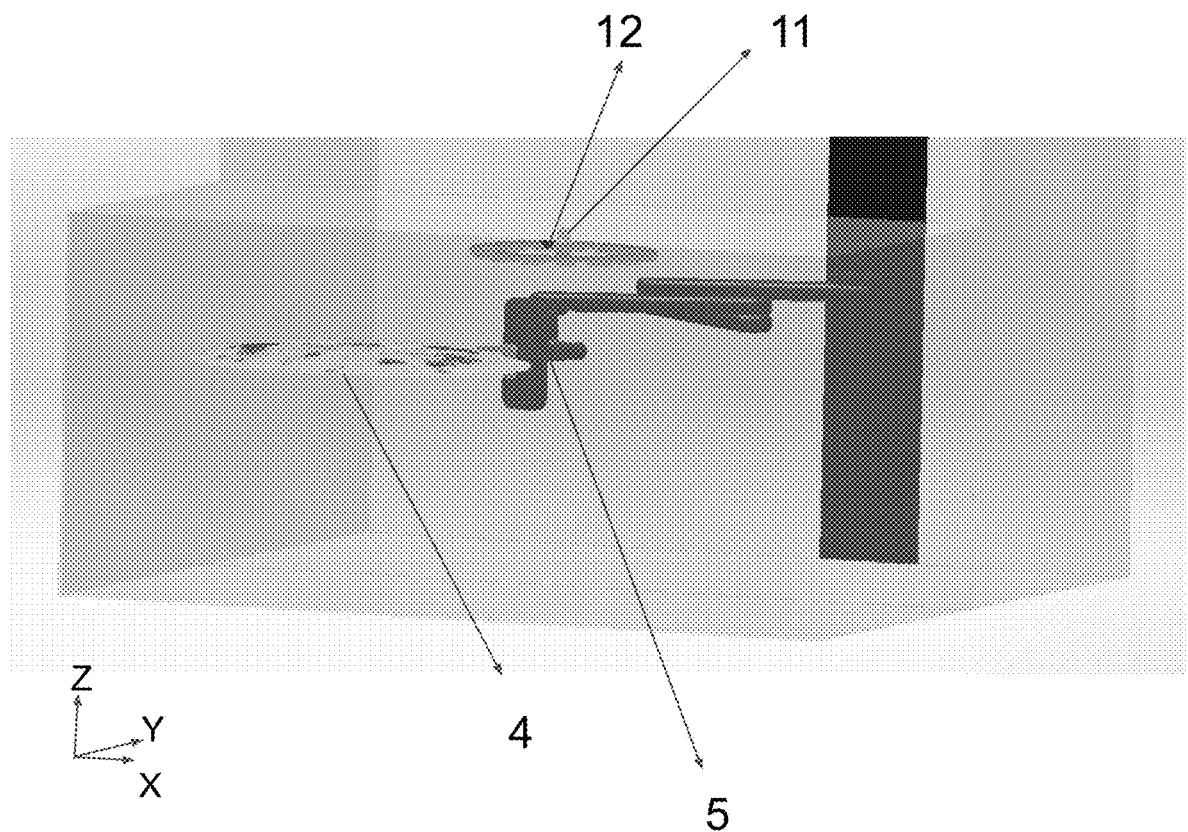
FIG. 26 shows a three-dimensional close-up view of a dish handling robot tilting a soiled plate by 180 degrees about the Y-axis in the wash module, in order to get it cleaned, in accordance with the invention.

FIG. 26 shows a three-dimensional close-up view of a dish handling robot tilting 7 a soiled plate 4 by 180 degrees about the Y-axis in the wash module 3, in order to get it cleaned, in accordance with the invention.

Figure 27:
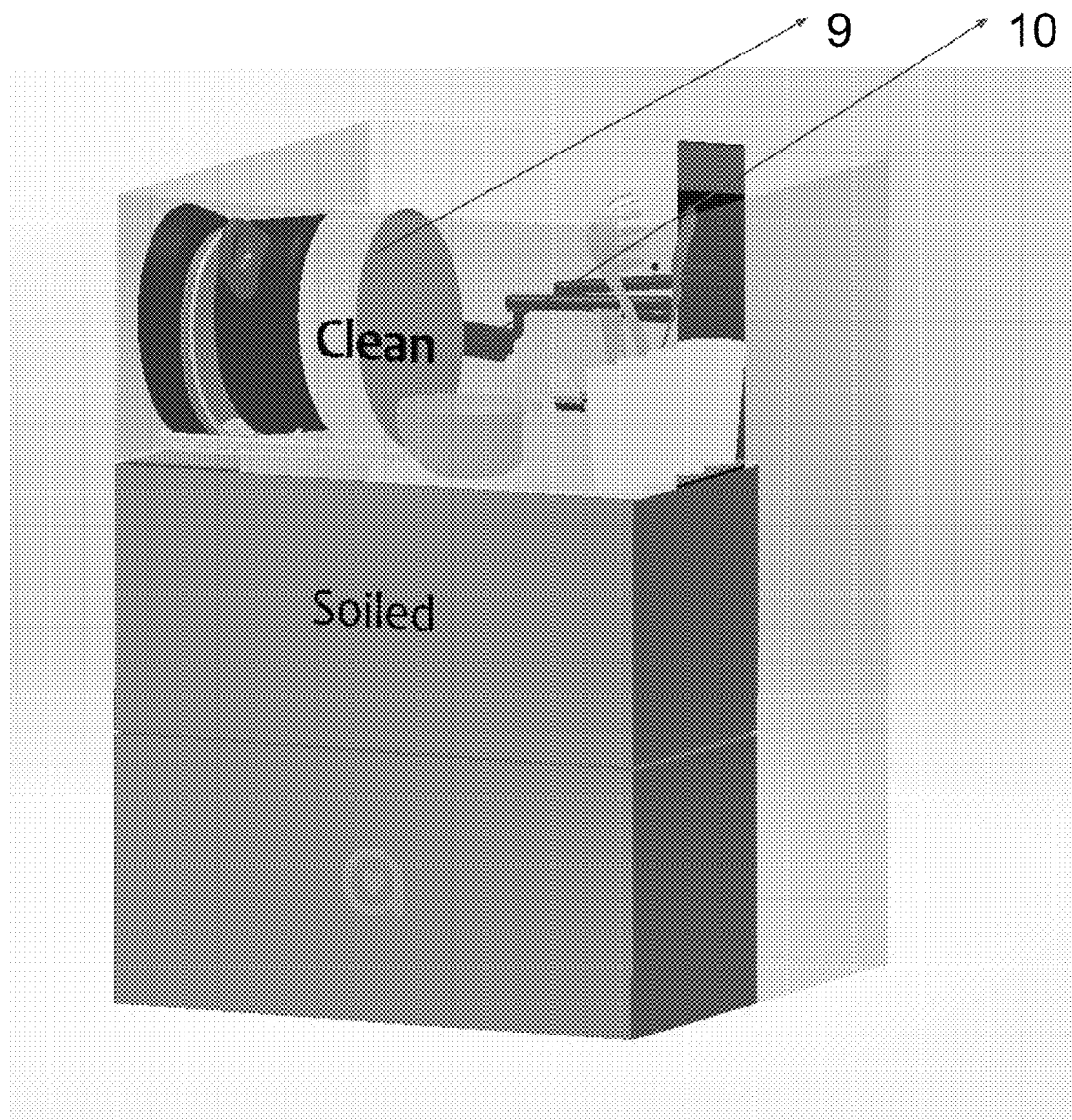
FIG. 27 shows a three-dimensional view of a dish handling robot dropping off a plate in the clean cabinet, in accordance with the invention.

FIG. 27 shows a three-dimensional view of a dish handling robotic arm 5 dropping off a clean plate 9 in clean cabinet 1 after washing, in accordance with the invention.

Figure 28:
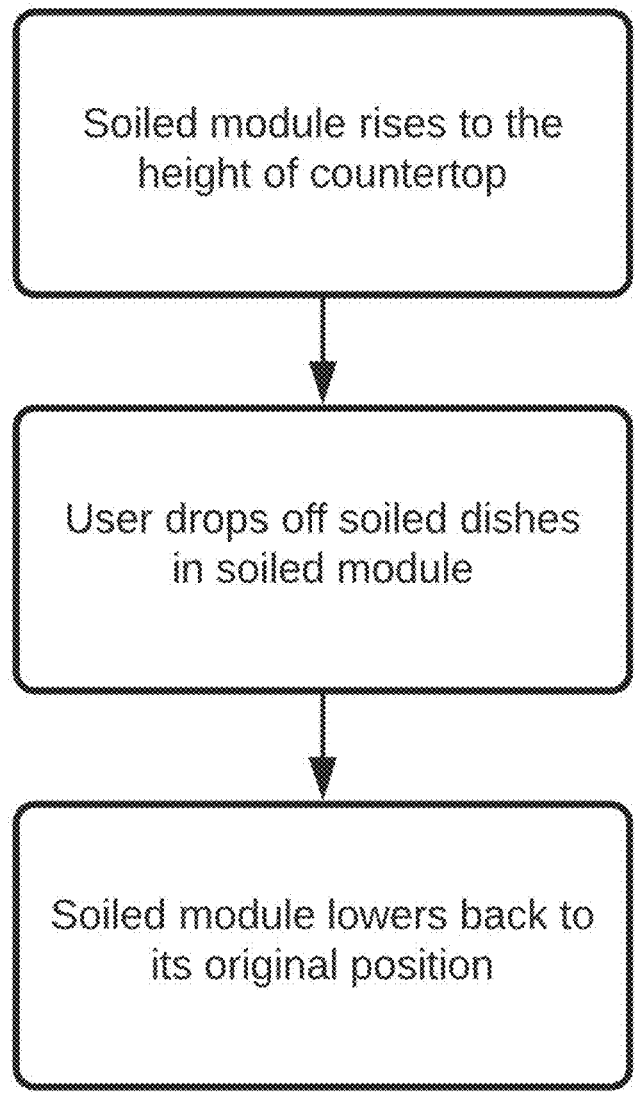
FIG. 28 shows a general overview of the method for raising and lowering the soiled module for dropping of dishes, in accordance with the invention.

FIG. 28 shows a general overview of the method for raising and lowering the soiled module 2 for dropping of dishes, in accordance with the invention. The first step involves the movement of the soiled module, originally in the middle, which is at a lower height, to the height of the countertop. This is to facilitate the loading of dishes by the user. The second step involves the user dropping off the soiled dishes in the soiled module which is now at a comfortable height for the user. The third step involves the movement of the soiled module to its original position. Accordingly, the raising of the soiled module eliminates the need for bending for dropping off dishes.

Figure 29:
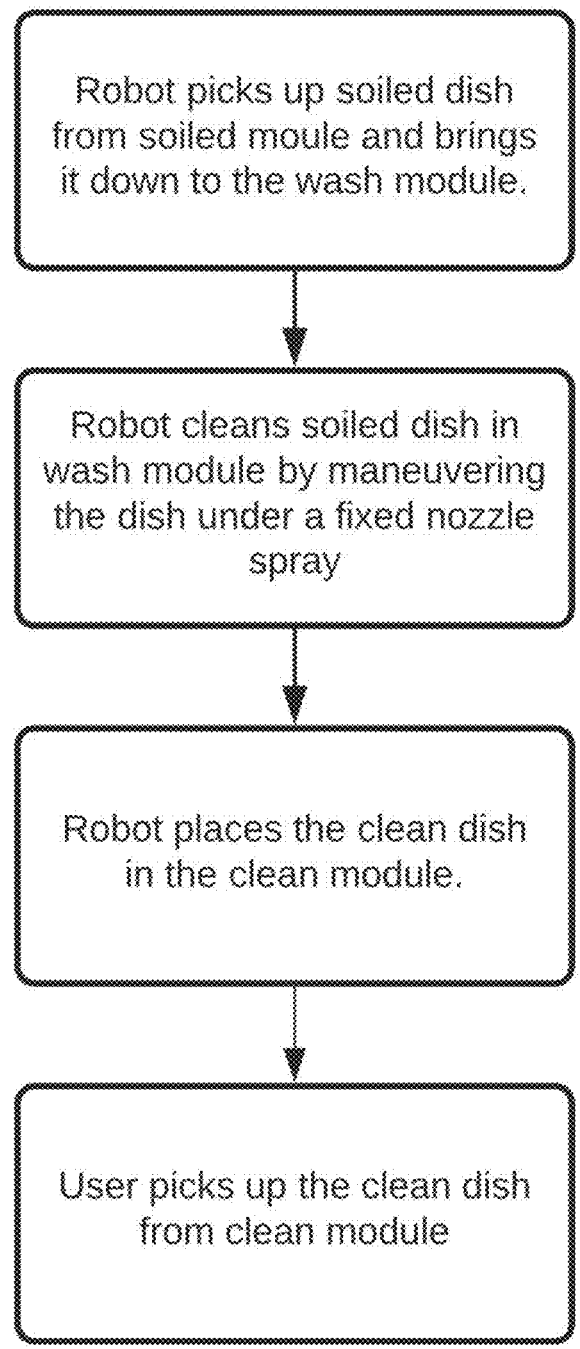
FIG. 29 shows a general overview of the method for cleaning a dish in an autonomous dishwashing system, in accordance with the invention.

FIG. 29 shows a general overview of the method for cleaning a dish in an autonomous dishwashing system, in accordance with the invention. The first step involves the robot picking up a soiled dish from the soiled module and bringing it down to the wash module. The second step involves the cleaning of the soiled dish by a robot under a static nozzle system. The robot maneuvers the soiled dish under the static nozzle to get it cleaned. In some embodiments, the static nozzle system expels a fluid at different flow rates depending on the requirement of the cleaning process. In some embodiments, fluid refers to any liquid or gas used for cleaning and drying a dish. In some embodiments, fluid comprises clean water, recycled water, hot water, cold water, detergent, air, or rinse aid. The third step involves the robot placing the now cleaned dish in the clean module from the wash module. The fourth step involves the user picking up the cleaned dish which is placed in the clean module by the robot.

Figure 30:
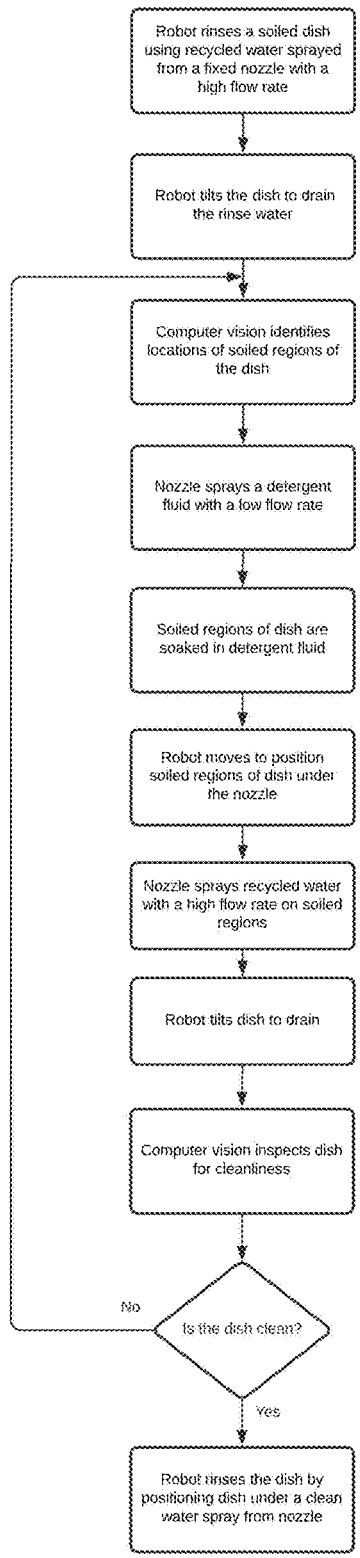
FIG. 30 shows a process for cleaning a dish in an autonomous dishwashing system, in accordance with the invention.

FIG. 30 shows a process for cleaning a dish in an autonomous dishwashing system, in accordance with the invention. The first step involves the soiled dish being rinsed with recycled water at a high flow rate under a static nozzle with the help of the robot which holds the dish and moves it around. The second step involves the robot tilting the plate to drain off the water. The third step involves a camera capturing an image of the soiled dish and a processor executing an algorithm to determine a cleaning protocol based on the images. In some embodiments, the cleaning protocol lists a time sequence of a plurality of robot positions. In some embodiments, robot positions are determined by localizing the position of a soiled region on said article. In some embodiments, the cleaning protocol lists robot positions such that fluid is sprayed only on soiled regions of a dish. In some embodiments, the cleaning protocol lists robot positions such that fluid is sprayed on all the regions of a dish. In some embodiments, the cleaning protocol lists robot positions such that fluid is sprayed on the center of a soiled region on a dish. In some embodiments, the cleaning protocol lists robot positions such that fluid is sprayed on the edge of a soiled region on a dish. In some embodiments, the cleaning protocol further lists a time sequence of fluid type and a time sequence of fluid flow rates. The fourth step involves the static nozzle system spraying a detergent fluid at a low flow rate. The fifth step involves the soiled dish being soaked in the detergent fluid for some time. The sixth step involves the robot moving the soiled dish such that the soiled regions are directly below the nozzle. The seventh step involves the nozzle system spraying water at a high flow rate onto the soiled regions of the plate. The eighth step is where the robot tilts the dish once again to drain off the water on the dish. In the ninth step, the computer analyses the dish for cleanliness with an image from the camera. If the dish is not clean, steps three to eight are being repeated. Accordingly, in some embodiments, the cleaning protocol has a feedback loop that involves acquiring an image followed by the execution of an adaptive cleaning protocol multiple times until the dish is clean. If the dish is analyzed as clean, the robot positions the dish to undergo a final rinse under clean water from the static nozzle system, which is the tenth step in the diagram.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described above, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as a random access memory (RAM), a read only memory (ROM), a storage device such as a solid state drive (SSD) or a hard drive. Any such computer readable medium may reside on or within a single computational apparatus, and may be present on or within different computational apparatuses within a system or network.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A system for cleaning an article, comprising:
   a. a static nozzle to spray a fluid, wherein the position and the orientation of said nozzle remains unchanged and the size of said spray is substantially smaller than the size of said article when said spray makes contact with said article;
   b. a robotic arm to grasp and move said article;
   c. a camera to acquire an image of said article;
   d. a processor configured to:
      i. execute a cleaning protocol based on said image, wherein said cleaning protocol lists a time sequence of a plurality of robot positions such that said spray makes contact with all regions of said article;
      ii. execute a targeted cleaning protocol based on said image, wherein said targeted cleaning protocol lists a time sequence of a plurality of robot positions such that said spray makes more contact with soiled regions of said article relative to clean regions of said article; and
      iii. execute a feedback loop that involves acquiring said image followed by the execution of said targeted cleaning protocol repeatedly until said article is clean;
   whereby said article is cleaned thoroughly in real-time.

2. The system of claim 1, wherein said static nozzle sprays a plurality of fluid types at a plurality of flow rates.

3. The system of claim 1, wherein said cleaning protocol and said targeted cleaning protocol further list a time sequence of fluid type and a time sequence of fluid flow rates.

4. The system of claim 1, wherein said fluid comprises water, detergent, or a rinse agent.

5. The system of claim 1, wherein said article is a dish.

6. The system of claim 1, wherein said robotic arm comprises an end effector to grasp a plurality of articles.

7. The system of claim 1, wherein said robotic arm comprises a plurality of degrees of freedom to position its end effector to move said article from one spatial position to another spatial position.

8. The system of claim 1, wherein said robotic arm rotates said article.

9. The system of claim 1, wherein said targeted cleaning protocol lists robot positions such that said fluid is sprayed on the center of a soiled region on said article.

10. The system of claim 1, wherein said targeted cleaning protocol lists robot positions such that said fluid is sprayed on the edge of a soiled region on said article.

\* \* \* \* \*